United States Patent
Baily et al.

(10) Patent No.: US 11,377,850 B2
(45) Date of Patent: Jul. 5, 2022

(54) FOAM WALL STRUCTURES WITH HIGH SHEAR STRENGTH AND METHODS FOR THE MANUFACTURE THEREOF

(71) Applicant: Covestro LLC, Pittsburgh, PA (US)

(72) Inventors: David M. Baily, Upper St Clair, PA (US); James L. Lambach, McMurray, PA (US); Michael F. Palmosina, II, Baden, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/053,177

(22) PCT Filed: May 7, 2019

(86) PCT No.: PCT/US2019/031070
§ 371 (c)(1),
(2) Date: Nov. 5, 2020

(87) PCT Pub. No.: WO2019/217385
PCT Pub. Date: Nov. 14, 2019

(65) Prior Publication Data
US 2021/0238850 A1    Aug. 5, 2021

Related U.S. Application Data

(60) Provisional application No. 62/667,786, filed on May 7, 2018.

(51) Int. Cl.
*E04C 1/00*    (2006.01)
*E04C 2/38*    (2006.01)
(Continued)

(52) U.S. Cl.
CPC .............. *E04C 2/386* (2013.01); *E04B 2/707* (2013.01); *B32B 5/18* (2013.01); *B32B 2607/00* (2013.01);
(Continued)

(58) Field of Classification Search
CPC .. E04C 2/386; E04B 2/707; E04B 2001/2696; B32B 2607/00
See application file for complete search history.

(56) References Cited

U.S. PATENT DOCUMENTS 2,009,619 A    7/1935    Huffine
2,030,157 A    2/1936    Cumpston
(Continued)

FOREIGN PATENT DOCUMENTS

DE    202014004695 U1    7/2014
FR    2941249 A1    7/2010
(Continued)

OTHER PUBLICATIONS

Oertel, Guenther, Polyurethane Handbook (2nd Edition), 1994, p. 276.
(Continued)

*Primary Examiner* — Basil S Katcheves
(74) *Attorney, Agent, or Firm* — Donald R. Palladino

(57) ABSTRACT

Wall structures and methods of manufacturing wall structures are described. The wall structures include a frame, a foam panel attached to the frame, a brace disposed in a cavity defined by the frame, and a foam layer. The wall structures can impart a high wall racking strength and good thermal performance through the combination of the foam layer, brace, and the foam panels.

20 Claims, 15 Drawing Sheets

(51) Int. Cl.
*E04B 2/70* (2006.01)
*B32B 5/18* (2006.01)
*E04B 1/10* (2006.01)
*E04B 1/26* (2006.01)

(52) U.S. Cl.
CPC ......... *E04B 1/10* (2013.01); *E04B 2001/2696* (2013.01)

(56) References Cited

U.S. PATENT DOCUMENTS

| | | | |
|---|---|---|---|
| 2,055,032 A | 9/1936 | Degian |
| 2,271,929 A | 2/1942 | Venzie |
| 2,745,779 A | 5/1956 | Ritter |
| 2,780,090 A | 2/1957 | Rasmussen |
| 3,619,437 A | 11/1971 | McDonald, Jr. |
| 3,785,913 A | 1/1974 | Hallamore |
| 4,236,361 A | 12/1980 | Boden |
| 4,292,775 A | 10/1981 | Howard |
| 4,443,988 A | 4/1984 | Coutu, Sr. |
| 4,471,591 A | 9/1984 | Jamison |
| 4,671,038 A | 6/1987 | Porter |
| 4,765,105 A | 8/1988 | Tissington et al. |
| 4,786,547 A | 11/1988 | St-Michel |
| 4,856,244 A | 8/1989 | Clapp |
| 4,885,886 A | 12/1989 | Rosso |
| 5,353,560 A | 10/1994 | Heydon |
| 5,389,167 A | 2/1995 | Sperber |
| 5,417,023 A | 5/1995 | Mandish |
| 5,950,386 A | 9/1999 | Shipman et al. |
| 5,950,389 A | 9/1999 | Porter |
| 5,953,883 A | 9/1999 | Ojala |
| 5,979,131 A | 11/1999 | Remmele et al. |
| 6,085,479 A | 7/2000 | Carver |
| 6,205,729 B1 | 3/2001 | Porter |
| 6,308,491 B1 | 10/2001 | Porter |
| 6,314,695 B1 | 11/2001 | Belleau |
| 6,332,304 B1 | 12/2001 | Fuhrman |
| 6,408,594 B1 | 6/2002 | Porter |
| 6,438,915 B1 | 8/2002 | Beauboeuf |
| 6,481,172 B1 | 11/2002 | Porter |
| 6,715,249 B2 | 4/2004 | Rusek |
| 6,854,218 B2 | 2/2005 | Weiss |
| 7,036,284 B1 | 5/2006 | Larson |
| 7,127,858 B2 | 10/2006 | Layfield |
| 7,168,216 B2 | 1/2007 | Hagen, Jr. |
| 8,033,065 B2 | 10/2011 | Paetkau et al. |
| 8,065,846 B2 | 11/2011 | McDonald et al. |
| 8,365,497 B2 | 2/2013 | Rothwell |
| 8,397,465 B2 | 3/2013 | Hansbro et al. |
| 8,458,983 B2 | 6/2013 | Propst |
| 8,635,778 B1 | 1/2014 | Hagaman |
| 8,844,243 B1 | 9/2014 | Gillman |
| 8,875,472 B2 | 11/2014 | Korwin-Edson |
| 8,925,270 B2 | 1/2015 | Grisolia et al. |
| 8,959,862 B1 | 2/2015 | Kreizinger |
| 9,145,688 B2 | 9/2015 | Hunt-Hansen |
| 9,523,195 B2 | 12/2016 | Nandi |
| 9,562,359 B1 | 2/2017 | Grisolia et al. |
| 9,938,711 B2 | 4/2018 | Grisolia et al. |
| 10,006,198 B2 | 6/2018 | Parsons et al. |
| 10,167,630 B2 | 1/2019 | Giles |
| 10,294,668 B2 | 5/2019 | Kreizinger |
| 10,301,823 B2 | 5/2019 | Kreizinger |
| 10,370,849 B2 | 8/2019 | Lambach et al. |
| 10,415,244 B2 | 9/2019 | Giles et al. |
| 2002/0012785 A1 | 1/2002 | Leduc |
| 2002/0046514 A1* | 4/2002 | Leung .............. E04C 2/386 52/167.3 |
| 2002/0108320 A1 | 8/2002 | Weiss |
| 2002/0129577 A1 | 9/2002 | Weiss |
| 2003/0041544 A1 | 3/2003 | Devalapura |
| 2004/0016194 A1 | 1/2004 | Stefanutti et al. |
| 2004/0200171 A1 | 10/2004 | Schilger |
| 2005/0055973 A1 | 3/2005 | Hagen, III |
| 2005/0106360 A1 | 5/2005 | Castiglione |
| 2005/0188649 A1 | 9/2005 | Hagen, III |
| 2005/0247021 A1 | 11/2005 | Schauffele |
| 2006/0026925 A1 | 2/2006 | Strawmen |
| 2007/0094963 A1 | 5/2007 | McDonald |
| 2009/0098357 A1 | 4/2009 | Bergtold |
| 2009/0320397 A1 | 12/2009 | Hansbro et al. |
| 2010/0011701 A1 | 1/2010 | Cole |
| 2010/0043327 A1 | 2/2010 | Rothwell |
| 2010/0095613 A1 | 4/2010 | Paetkau |
| 2011/0138724 A1 | 6/2011 | Olang |
| 2011/0173911 A1 | 7/2011 | Propst |
| 2011/0214374 A1 | 9/2011 | Propst |
| 2012/0011792 A1 | 1/2012 | Bergtold |
| 2012/0028563 A1 | 2/2012 | Sacks |
| 2012/0096785 A1 | 4/2012 | Weeks |
| 2012/0159765 A1 | 6/2012 | Propst |
| 2012/0240501 A1 | 9/2012 | Spiegel |
| 2012/0247040 A1 | 10/2012 | Buoni et al. |
| 2013/0104469 A1 | 5/2013 | Fay |
| 2013/0104480 A1 | 5/2013 | Smith |
| 2013/0305643 A1 | 11/2013 | Singleton et al. |
| 2013/0312350 A1 | 11/2013 | Kreizinger |
| 2014/0053486 A1 | 2/2014 | Grisolia et al. |
| 2014/0115989 A1 | 5/2014 | Sievers et al. |
| 2014/0115991 A1 | 5/2014 | Davenport |
| 2014/0250827 A1 | 9/2014 | Gillman |
| 2014/0265027 A1 | 9/2014 | Kreizinger |
| 2015/0093535 A1 | 4/2015 | Lambach et al. |
| 2015/0111001 A1 | 4/2015 | Sagnard et al. |
| 2015/0140243 A1 | 5/2015 | Sagnard et al. |
| 2017/0030074 A1 | 2/2017 | Ndobo-Epoy et al. |
| 2019/0100917 A1 | 4/2019 | Malinowski |

FOREIGN PATENT DOCUMENTS

| | | |
|---|---|---|
| IE | 20050080 A1 | 8/2006 |
| JP | 5546961 A | 4/1980 |
| JP | 56000437 A | 1/1981 |
| JP | 60108609 U | 7/1985 |
| JP | 3115643 A | 5/1991 |
| JP | 06158753 A | 6/1994 |
| JP | 11200521 A | 7/1999 |
| JP | 2008132676 A | 6/2008 |
| JP | 3159655 U | 5/2010 |
| JP | 2013091246 A | 5/2013 |
| JP | 2017040141 A | 2/2017 |
| WO | 9914442 A1 | 3/1999 |
| WO | 9929978 A1 | 6/1999 |
| WO | 2020120382 A1 | 6/2020 |

OTHER PUBLICATIONS

International Search Report, dated Jul. 7, 2019, Authorized Officer: Claudio Stem.

* cited by examiner

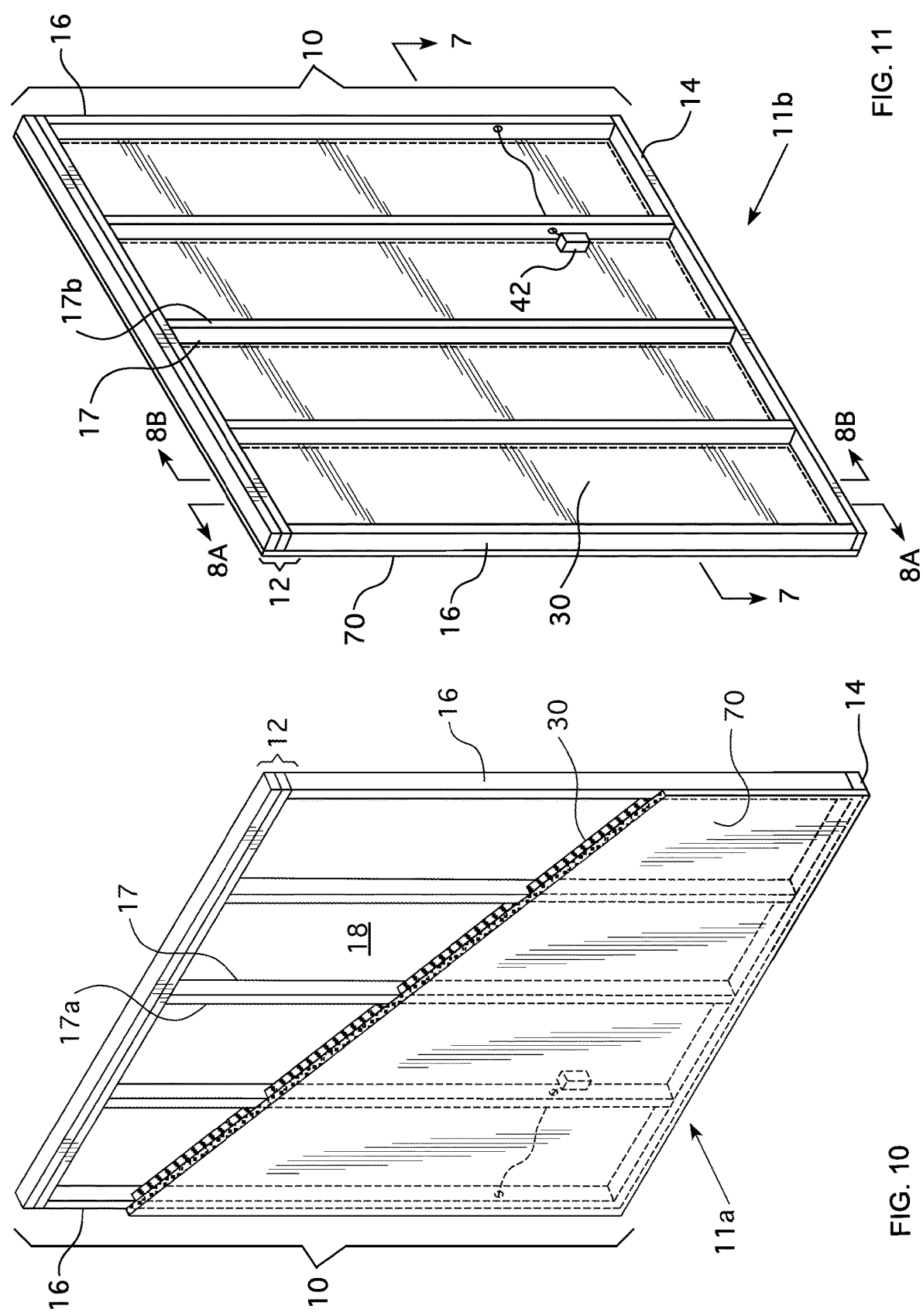

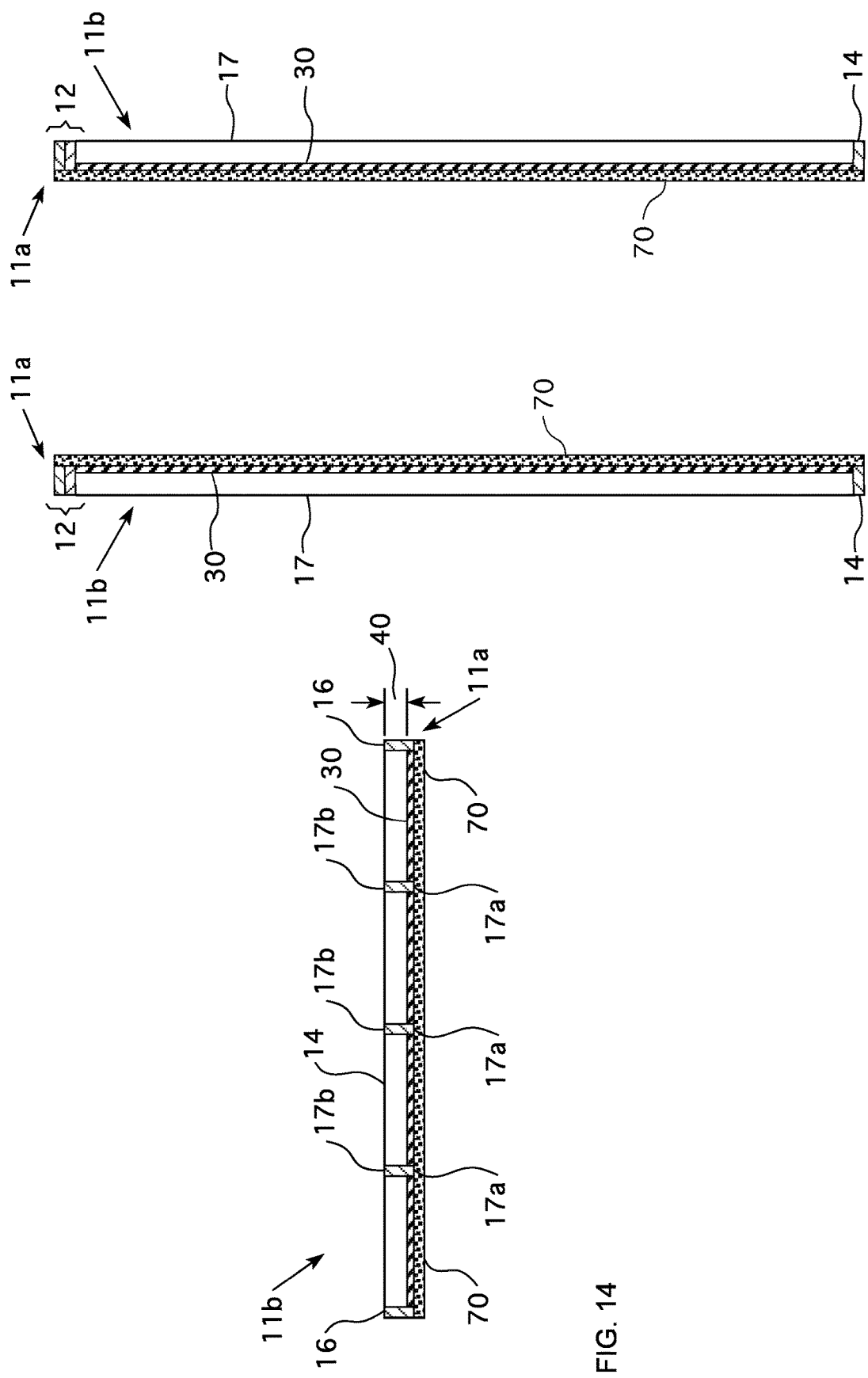

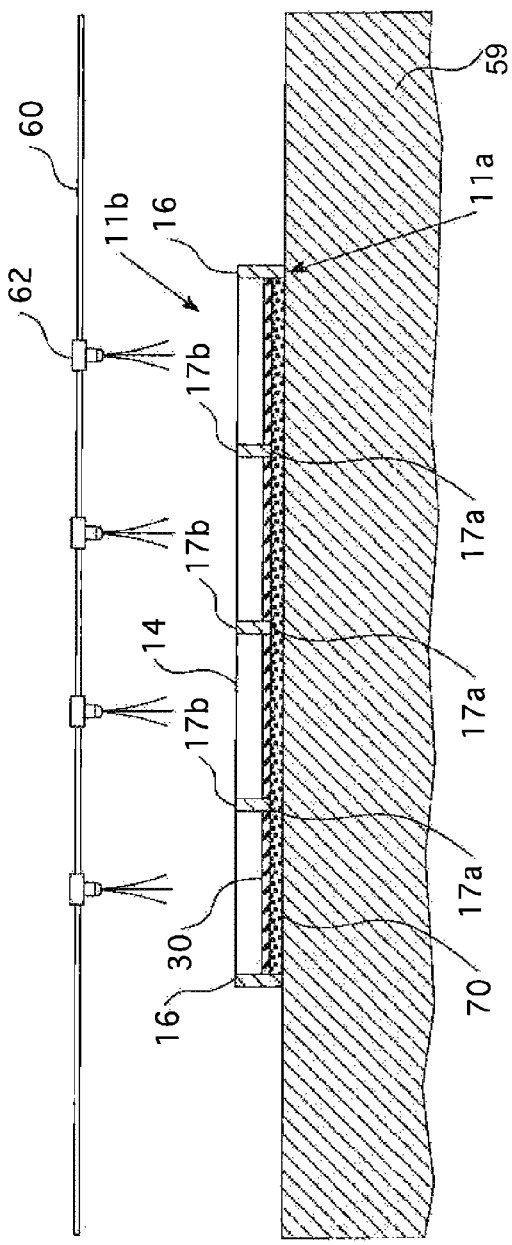
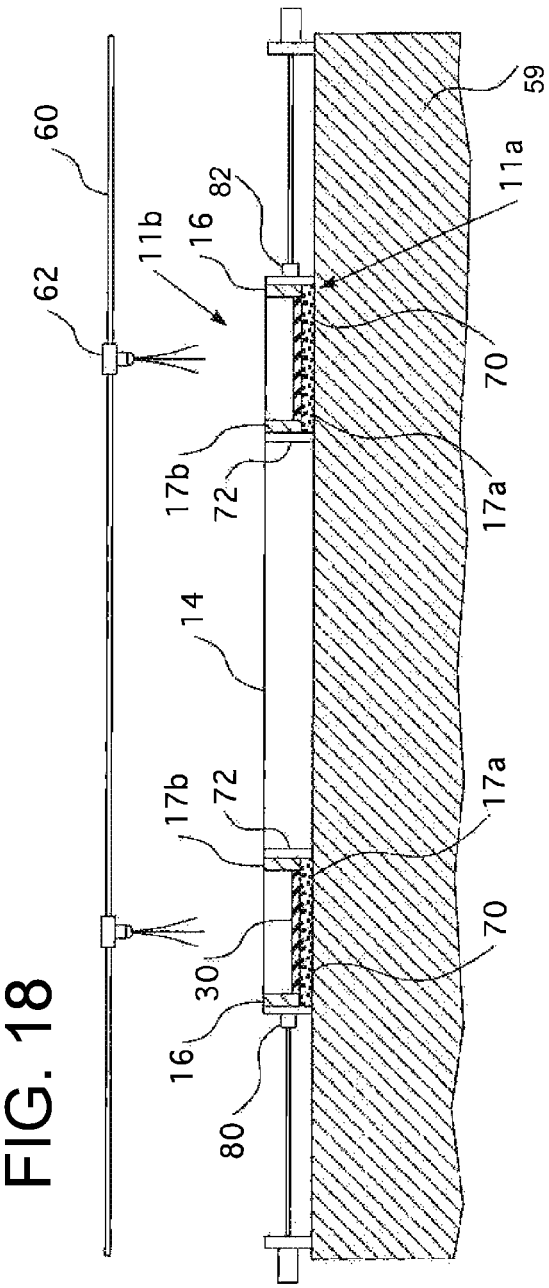
FIG. 18
FIG. 19

FOAM WALL STRUCTURES WITH HIGH SHEAR STRENGTH AND METHODS FOR THE MANUFACTURE THEREOF

CROSS-REFERENCE TO RELATED APPLICATIONS

This application is a national stage application under 35 U.S.C. § 371 of PCT/US2019/031070, filed May 7, 2019, which claims the benefit of U.S. Provisional Application No. 62/667,786, filed May 7, 2018, each of which is incorporated herein by reference.

FIELD

The present invention relates to foam wall structures and methods for making such structures in which a bracing member is located within a cavity formed by frame members and a foam panel to provide a foam wall structure with excellent shear strength.

BACKGROUND

Insulated wall panels provide thermal insulation for residential homes and buildings. A wall panel's R-value reflects its ability to impede heat flow. The greater the ability to impede heat flow, the higher the R-value. Over the years, insulation standards have become stricter, requiring higher R-values and continuous insulation on the exterior side of insulated walls. The current market solutions to these stricter requirements are typically (1) pre-fabricated wall panels that incorporate insulation at the construction site, and (2) Structural Insulated Panels (SIPs).

The pre-fabricated wall panel that incorporates insulation at the construction site is the more widely adopted solution in the market. However, this solution requires a separate sub-contractor for on-site installation with fiberglass batting, which is known to have suboptimal R-values. Fiberglass is not an air barrier and allows for air intrusion, thus increasing the probability of condensation and mold growth within wall systems. Furthermore, additional material is necessary to finish the wall (e.g., Oriented Strand Panels (OSBs) and house wrap) and the overall construction process duration is extended, thereby increasing the risk of trade scheduling conflicts. Installing insulation onsite also leads to potential inconsistencies in insulation installation, performance, and usage.

The second solution, SIPs, also have several drawbacks. SIPs typically utilize expanded polystyrene (EPS) foam insulation sandwiched between two OSB panels, which only provide thermal performance of about R-4 per inch. Additionally, current SIPs are mainly used by smaller scale home builders with high levels of home customization.

More recently, insulated wall structures satisfying the strict industry insulation requirements that can be made without excessive material and labor costs have been proposed. According to one proposal, a foam wall structure includes a faced polyisocyanurate panel attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

While such foam wall structures can provide many benefits, including strength, it would be desirable to provide foam wall structures that exhibit further strength such that they may be suitable for use in particularly demanding seismic and other high shear zones, as well as in particularly demanding shear wall applications where the wall might experience additional loads due to large windows or other openings. In wall structures incorporating OSB sheathing, which is typically used in residential housing application to cover the wood stud frame where the OSB is attached to this frame with nails, the nails are placed increasingly close together if it is required for a wall structure to bear additional load or if it is anticipated that it might see additional shear during use. This increased nailing pattern makes the walls stronger, but is labor intensive.

The present invention has been made in view of the foregoing.

SUMMARY

In certain respects, the specification relates to wall structures. These wall structures comprise a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity within the frame; (c) a brace disposed within the cavity and fastened to the frame with one or more mechanical fasteners, the brace comprising: (i) a plurality of brace members comprising a front brace member surface and a rear brace member surface that form a front brace surface facing the foam panel and a rear brace surface facing away from the foam panel; and (ii) a connector connecting a brace member to another brace member; and (d) a foam layer disposed within the cavity, wherein the foam layer adheres to the foam panel and the brace.

In other respects, the specification relates to wall structures. These wall structures comprise a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity within the frame; (c) a brace disposed within the cavity, the brace comprising: (i) a plurality of brace members comprising a front brace member surface and a rear brace member surface that form a front brace surface facing the foam panel and a rear brace surface facing away from the foam panel; and (ii) a lateral load bearing connector connecting a brace member to another brace member; and (d) a foam layer disposed within the cavity, wherein the foam layer adheres to the foam panel.

The present specification also relates, among other things, to methods of making such wall structures and buildings comprising such wall structures.

BRIEF DESCRIPTION OF THE DRAWINGS

Various features and characteristics of the inventions described in this specification may be better understood by reference to the accompanying figures, in which:

FIG. 10 is a front perspective view of a wall structure comprising a foam panel and a foam layer shown in partial cut-away;

FIG. 11 is rear perspective view of the wall structure shown in FIG. 10;

FIG. 14 is a top cross-sectional view of the wall structure shown in FIGS. 10 and 11;

FIG. 15A is a side cross-sectional view of the wall structure shown in FIGS. 10 and 11;

FIG. 15B is a side cross-sectional view of the wall structure shown in FIGS. 10 and 11;

FIG. 18 is a top cross-sectional view of foam material being deposited into a frame;

FIG. 19 is a top cross-sectional view of foam material being deposited into a frame.

Figure 1:
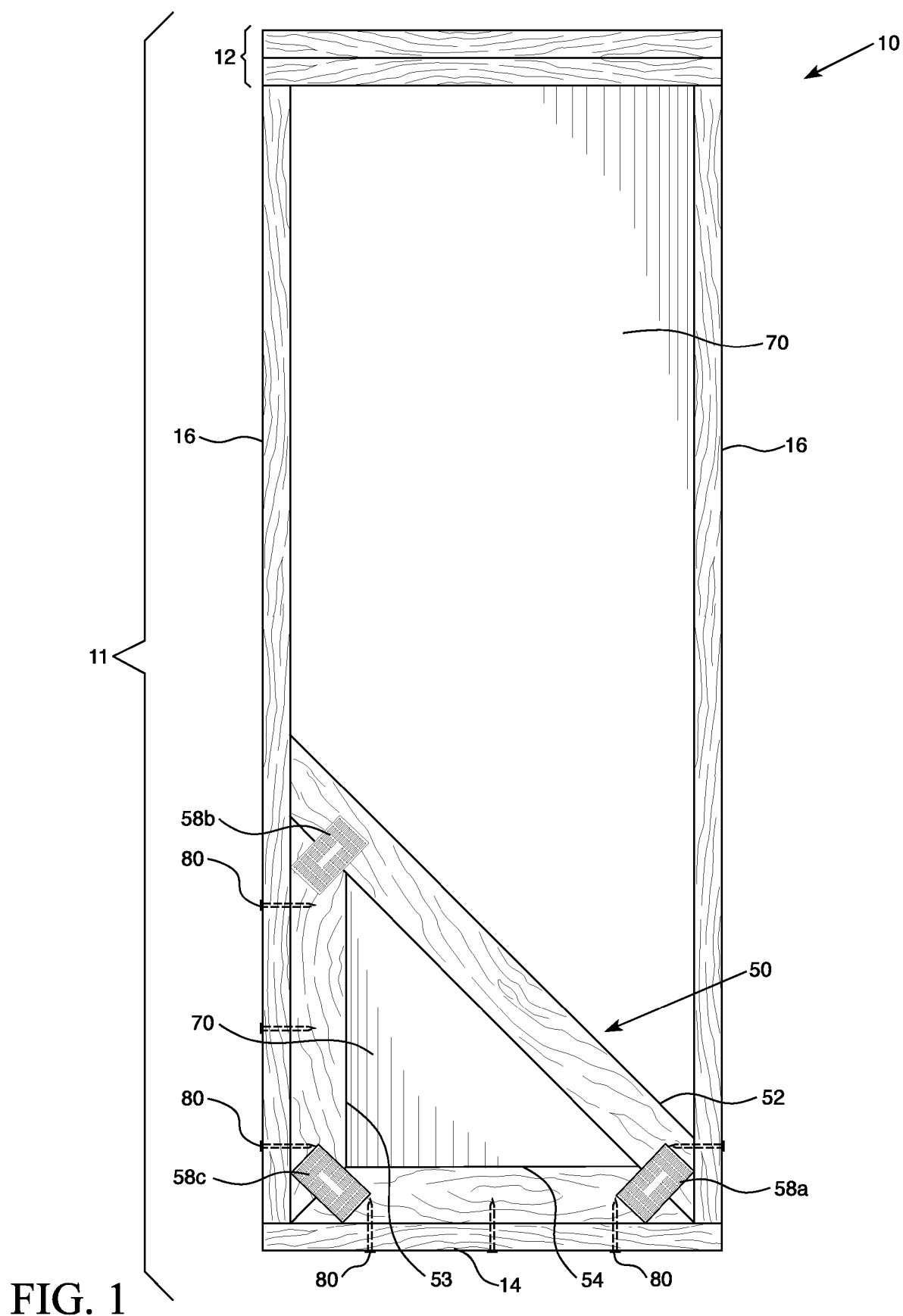
FIG. 1 is a rear view of an embodiment of a wall structure comprising a frame, a foam panel attached to the frame, and a brace disposed within a cavity.
Figure 2:
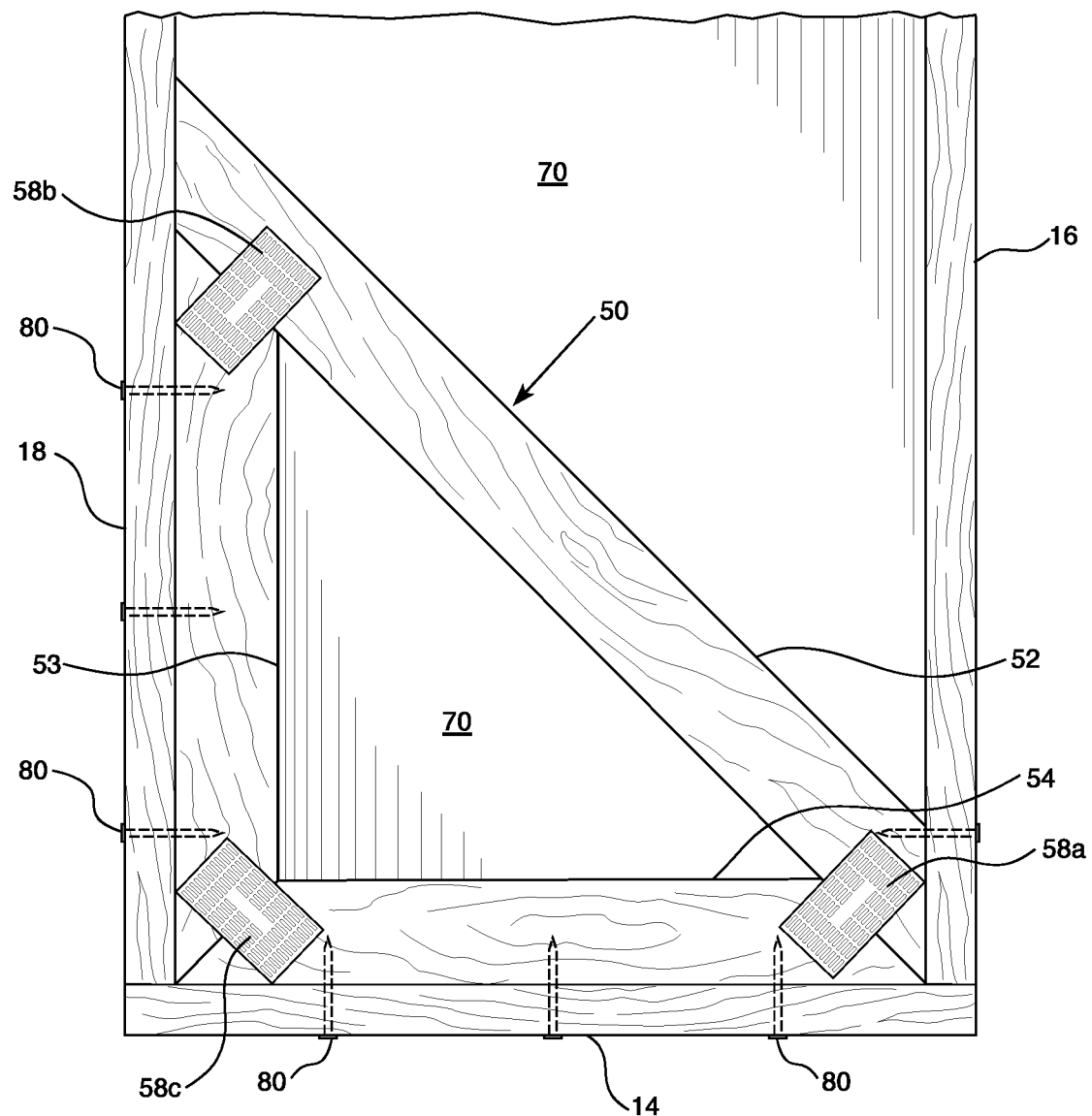
FIG. 2 is an enlarged rear view of the wall structure shown in FIG. 1.
Figure 3:
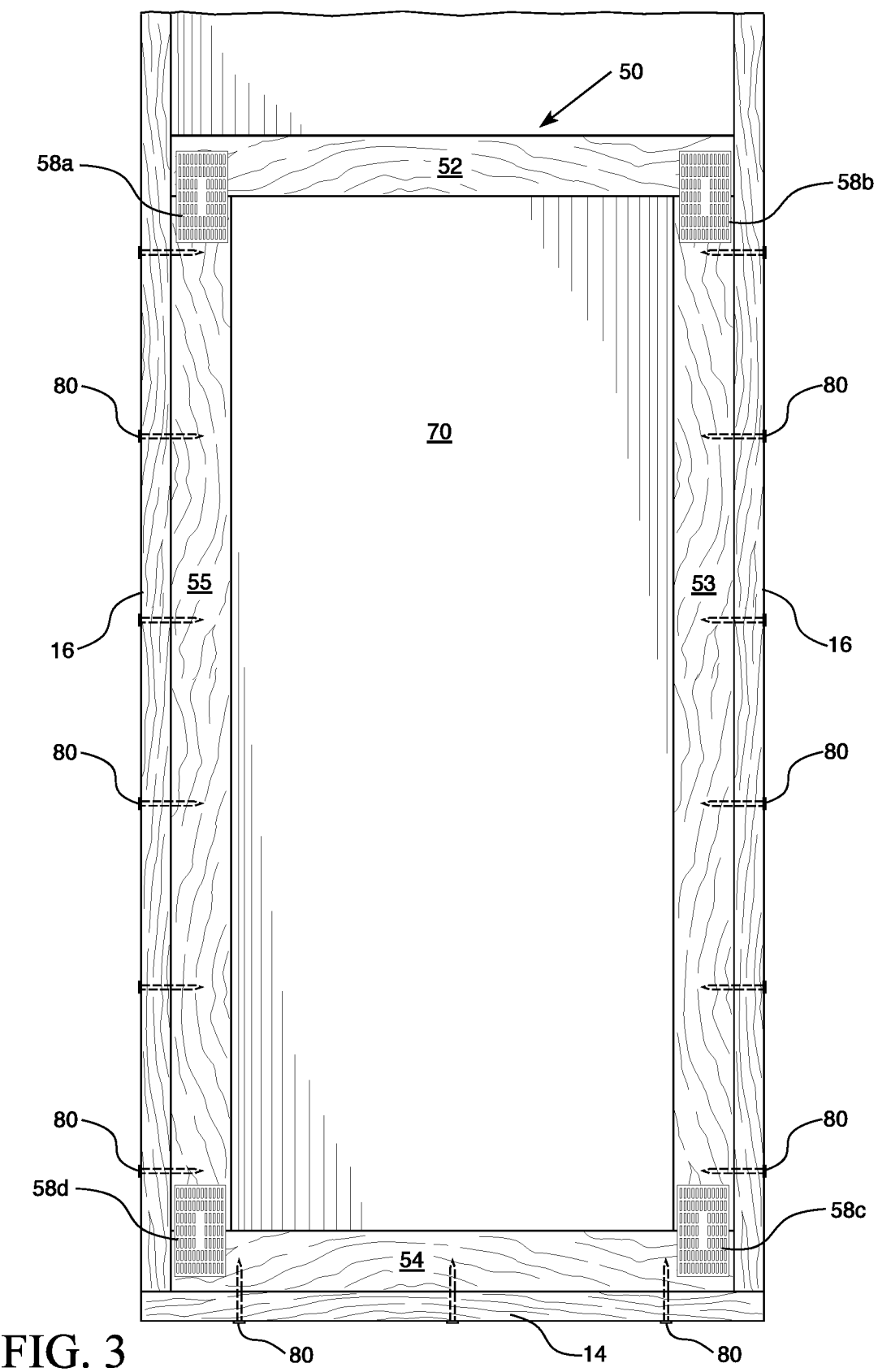
FIG. 3 is a rear view of another embodiment of a wall structure comprising a frame, a foam panel attached to the frame, and a brace disposed within a cavity.
Figure 4:
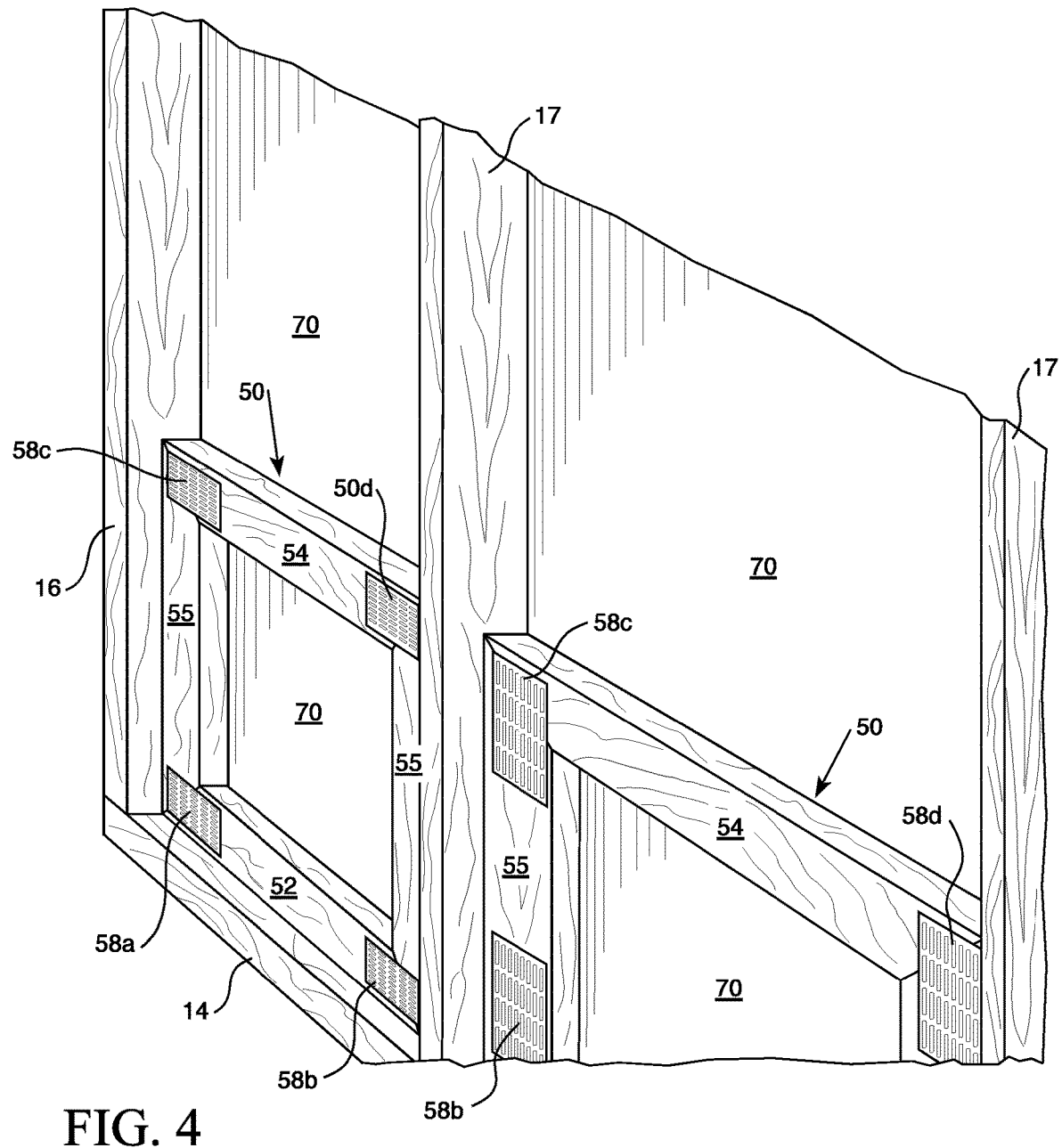
FIG. 4 is a rear view of another embodiment of a wall structure comprising a frame, a foam panel attached to the frame, and a brace disposed within a cavity.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

Referring to FIGS. 1-5, for example, a wall structure 10 comprises frame 11. The frame 11 comprises a first member 12, a second member 14 spaced apart from the first member 12, and connecting members (such as two side members) 16 extending between the first member 12 and the second member 14. As used herein, the term "connecting member" refers to a member that connects first member 12 with second member 14 and includes side members 16 and primary support members 17 (which are described in more detail below). The first member 12, the second member 14, and the connecting members 16 each comprise a front surface (12a, 14a, and 16a, respectively) and a rear surface (12b, 14b, and 16b, respectively) that collectively form a front frame surface 11a and a rear frame surface 11b. The constituent members (12, 14, and 16) of the frame 11 can be made out of a suitable material of construction such as wood. For example, the constituent members (12, 14, and 16) of the frame 11 can comprise wooden 2×4 members and/or wooden 2×6 members (i.e., structural members made of wood having nominal thicknesses of about 2-inches, nominal widths of about 4-inches or about 6-inches, and suitable lengths) secured together with fasteners such as nails, nail plates, screws, staples, bolts, or rivets, or a combination of any thereof.

A foam panel 70 may be attached to the front frame surface 11a so that the foam panel overlies the front frame surface. As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, OSBs, and other structural panels, such as fibrous structural panels, gypsum panels and SIS. As a result, some embodiments of the wall structures of this present specification do not include a wood panel, a plywood panel, an OSB, a fibrous structural panel, a gypsum panel, an SIS or, in some cases, any other panel, disposed on the front surface of the foam panel or on the rear surface of the foam panel between the foam panel and the front frame surface. In some embodiments, the wall structures of this present specification do not include a wood panel, a plywood panel, an OSB, a fibrous structural panel, a gypsum panel, an SIS or, in some cases, any panel, at any location between the front frame surface and the exterior wall of the building in which the wall structure is placed. In some embodiments, the wall structures of the present specification do not include a wood panel, a plywood panel, an oriented strand board panel, a fibrous structural panel, a gypsum panel, and/or a composite panel that includes a wood panel or a fibrous panel, or, in some cases any other type of panel with a higher fastener pull-out strength than a foam panel. In some embodiments, such wall structures do not include any panels aside from foam panel(s).

As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 attached to the front frame surface 11a can comprise a facer material on a rear face and/or a front face of a foam layer. For example, the foam panel 70 may comprise a polyiso panel comprising a polyisocyanurate foam layer and a facer material attached to a front face and/or a rear face of the polyisocyanurate foam layer. Although facer materials can be attached to both the front face and the rear face of the polyisocyanurate foam layer, it is understood that a polyiso panel or other type of foam panel can comprise a facer material attached to just one face, either the front face or the rear face, of a polyisocyanurate foam layer or other core foam layer (e.g., expanded polystyrene or extruded polystyrene).

Polyiso panels and other types of foam panels generally comprise a facer material attached to and substantially covering both sides (the front and rear faces) of a polyisocyanurate foam layer or other core layer. For example, facer materials can comprise glass mats filled with recycled cardpanel and colored with carbon black. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises facer materials on both the front and rear faces of the polyisocyanurate foam layer or other core layer, then the facer material on the front face may be the same as or may be different than the facer material on the rear face. The facer material should meet the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with International Residential Code (IRC) 703.2 (2012) and/or International Building Code (IBC) 1404.2 (2015), which are each incorporated by reference into this specification. For embodiments in which the foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

In certain embodiments, however, the foam panel 70 comprises a polyiso panel comprising a facer material attached to and substantially covering both sides (the front and rear faces) of a polyisocyanurate foam layer, wherein the facer material comprises a coated glass facer, such as is available under the tradename WEBTECH® CGF, from Atlas Roofing Corporation. In fact, tensile adhesion between such a facer and the foam layer 30 that is formed from the relatively high density foam-forming compositions described below can be unexpectedly greater, when measured according to ASTM D1623-09 Type C, as compared to other facer materials, such as embossed foil and reinforced foil facer. For example, in certain embodiments, the tensile adhesion between a coated glass facer and such a foam layer 30 formed from such a composition is greater than 10 lb/in$^2$ (68.9 kPa), such as greater than 15 lb/in$^2$ (103.4 kPa), when measured according to ASTM D1623-09 Type C.

Referring again to FIGS. 1-5, the foam panel 70 may be attached to the front frame surface 11a. The foam panel 70 can be attached to any of the front faces (12a, 14a, and/or 16a) of the constituent members (12, 14, and 16) of the frame 11. For example, the foam panel 70 can be attached to the front faces 12a and 14a of the first and second members 12 and 14 and to the front faces 16a of the connecting members 16 extending therebetween. The foam panel 70 can be attached to the front frame surface 11a with fasteners and/or an adhesive (not shown). Attachment fasteners can include, but are not limited to, nails, staples, screws, bolts, screw nails or rivets, or a combination of any thereof. Attachment adhesives can comprise a construction adhesive that is compatible with the adjoining materials. For example, an adhesive used to attach a foam panel to a frame can comprise a foam material (which may be the same foam material or a different foam material as the foam material comprising the foam layer 30, described below) or the adhesive can be a non-foamed material.

The foam panel 70, the first member 12, the second member 14, and the connecting members 16 define a cavity 18 within the frame 11. According to the wall structures of the present specification a brace 50 is disposed within the cavity 18. The brace 50 comprises a plurality, such as at least 3 or, in some cases 3 or 4, brace members 52, 53, 54, and/or 55. The brace members 52, 53, 54, and/or 55 comprise a front brace member surface that forms a front brace surface 50a facing the foam panel 70 and a rear brace member surface that forms a rear brace surface 50b facing away from the foam panel 70. In addition, as is illustrated in particular by FIGS. 1-4, in some embodiments, a lateral load bearing connector 58a, 58b, 58c, and/or 58d connects a brace member 52, 53, 54, and/or 55 to another brace member 52, 53, 54, and/or 55 of the brace 50.

The brace members 52, 53, 54, and/or 55 can be made of various materials. For example, the brace members 52, 53, 54, and/or 55 can be made of wood, metal, fiberglass, plastic, wood-polymer composite materials, or a combination of any thereof.

The dimensions of the brace members 52, 53, 54, and/or 55 can vary. In some cases, the brace members 52, 53, 54, and/or 55 have the same thickness and width dimensions, and the same or different length dimensions. For example, in some embodiments, the brace members 52, 53, 54, and/or 55 are elongated members having a thickness and width dimensions of nominally 2×4 inches or nominally 2×6 inches. Exemplary, but non-limiting, length dimensions for brace members 52, 53, 54, and/or 55 include 16 to 48 inches, 16 to 32 inches, 16 to 24 inches, or 16 inches, such as those described in the Examples.

As is illustrated in FIGS. 1-4, in certain embodiments, the brace members 52, 53, 54, and/or 55 may each comprise an end, wherein connector(s) 58a, 58b, 58c, and/or 58d connects an end of one brace member 52, 53, 54, and/or 55 to an end of another brace member 52, 53, 54 and/or 55 to form a brace 50 that has a geometric shape, such as a triangle, square, or rectangle, although other geometric shapes can be readily envisioned. In certain embodiments, the brace 50 has a width substantially spanning the entire width of cavity 18, so that each of the sides of the brace 50 contacts a connecting member 16. Moreover, as is illustrated, in some embodiments, a brace member 52, 53, 54, and/or 55 is disposed substantially parallel to and in contact with a frame member 12, 14, and/or 16. In some cases, at least two, such as three, brace members 52, 53, 54, and/or 55 are in contact with a frame member 12, 14, and/or 16.

Moreover, in certain embodiments, the brace 50 is fastened to one or more of the frame members 12, 14 and/or 16 with one or more mechanical fasteners 80. The brace members 52, 53, 54 and/or 55 may be fastened to frame members 12, 14 and/or 16 using mechanical fasteners 80, such as nails (as shown in the Figures), screw nails, staples, screws, bolts, or rivets, or a combination of any thereof. Alternatively, or in addition, the brace members 52, 53, 54 and/or 55 may be fastened to frame members 12, 14 and/or 16 using an adhesive (not shown). For example, a layer of foam may be deposited onto the frame members 12, 14 and/or 16 and/or onto the brace members 52, 53, 54 and/or 55 before positioning the brace 50 into cavity 18.

As mentioned, and as is illustrated in particular by FIGS. 1-4, connector(s) 58a, 58b, 58c, and/or 58d connect a brace member 52, 53, 54, and/or 55 to another brace member 52, 53, 54, and/or 55 of the brace 50. Suitable connectors 58a, 58b, 58c, and/or 58d include, without limitation, any of the mechanical fasteners mentioned in the immediately preceding paragraph and, in some embodiments, comprise one or more lateral load bearing connectors, i.e., any structural component that is designed to resist tension, examples of which include ties, straps, tie rods, eyebars, wire ropes and cables. In certain embodiments, the lateral load bearing connector 58a, 58b, 58c, and/or 58d is a tie, such as a connector plate, which may also be referred to as a stud tie, a mending plate, a nail plate, a nail connector plate, a metal connector plate, a steel truss plate, a truss plate, or a plate. Suitable connector plates include those manufactured according to ASTM A653/A653M, A591, A792/A792M, or A167 structural quality steel which may be coated with a zinc or zinc-aluminum alloy coating. Other specific examples of suitable lateral load bearing connectors 58a, 58b, 58c, and/or 58d are bearing type fasteners, such as split ring and shear plate connectors.

Figure 5:
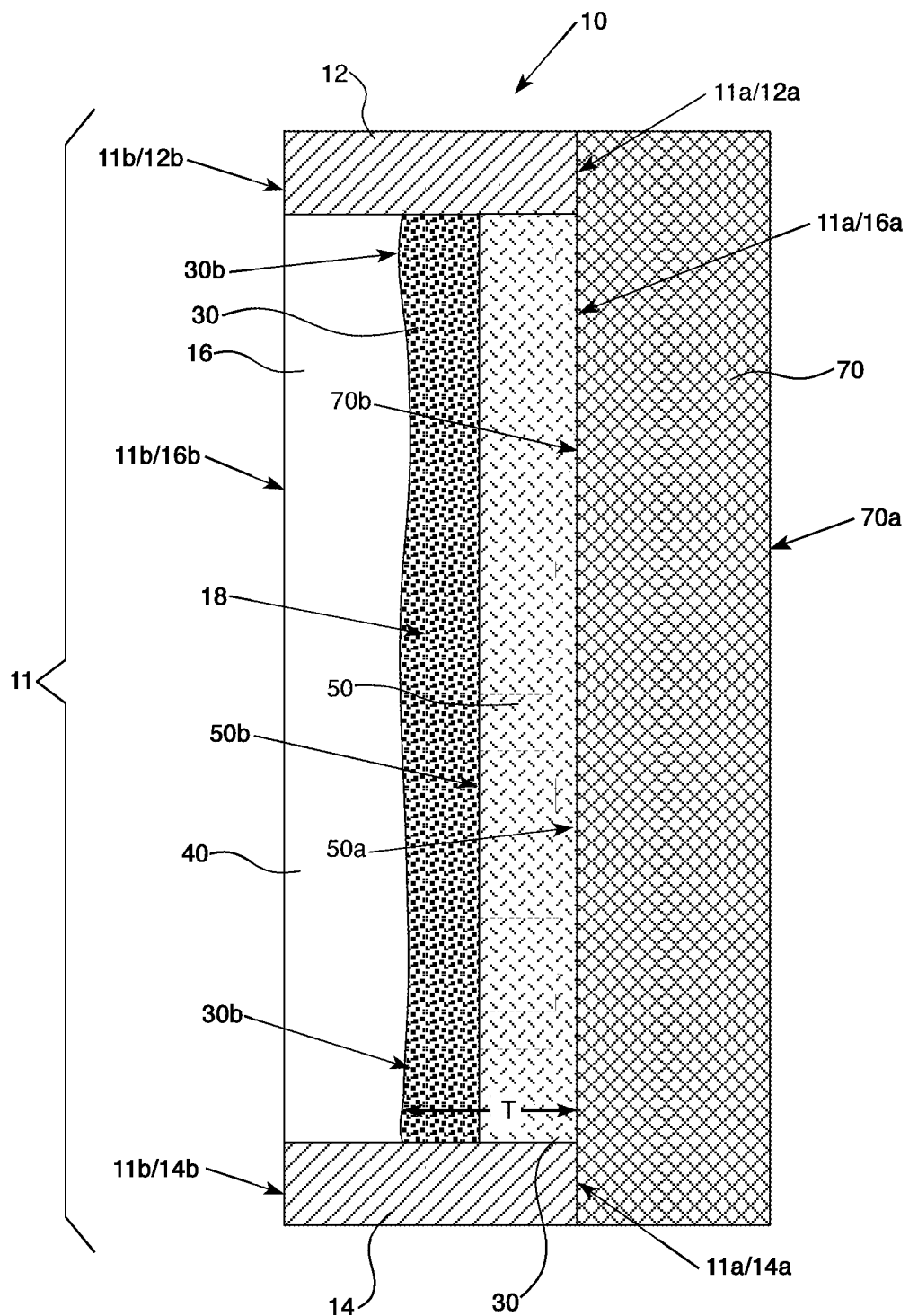
FIG. 5 is a side cross-sectional schematic diagram of an embodiment of a wall structure according to the present specification.
Figure 6A:
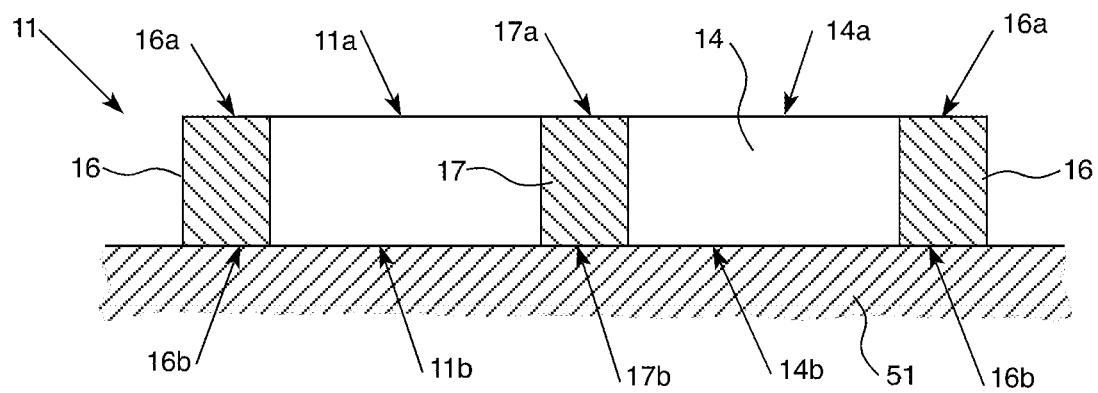
FIGS. 6A-6E are a series of cross-sectional schematic diagrams illustrating the manufacture of an embodiments of a wall structure according to the present specification.
Figure 6B:
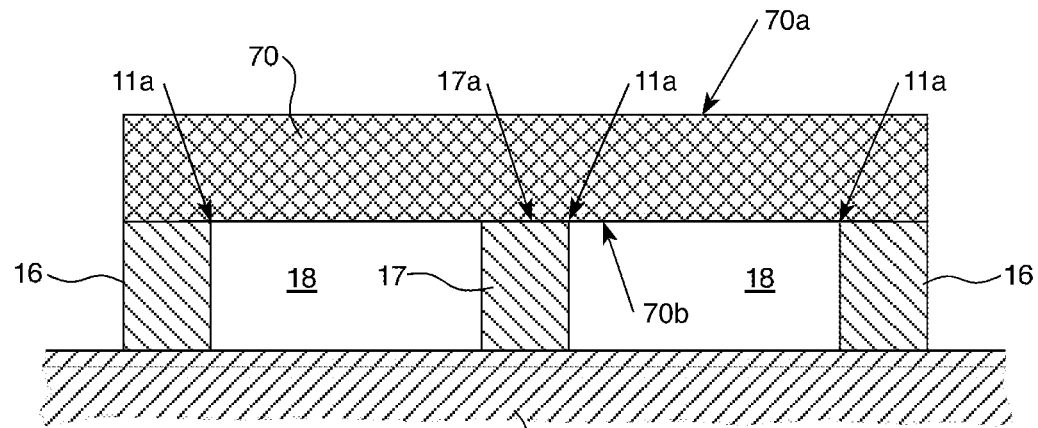
Figure 6C:
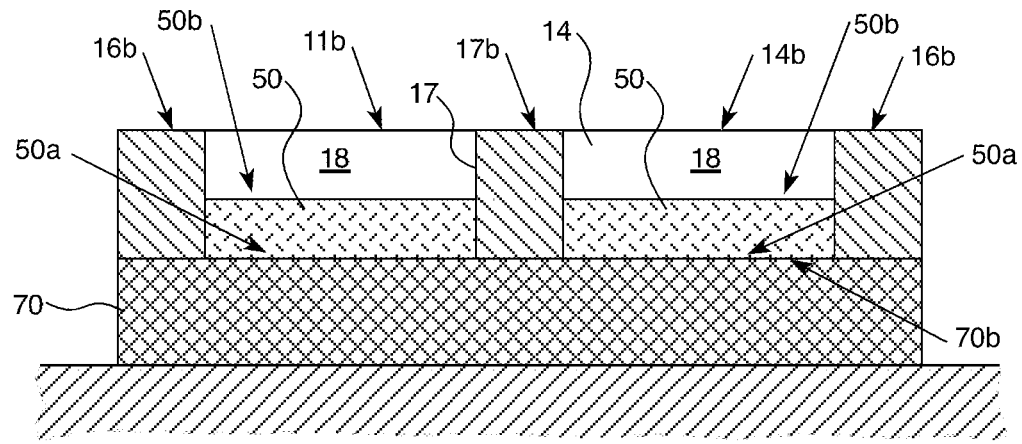
Figure 6D:
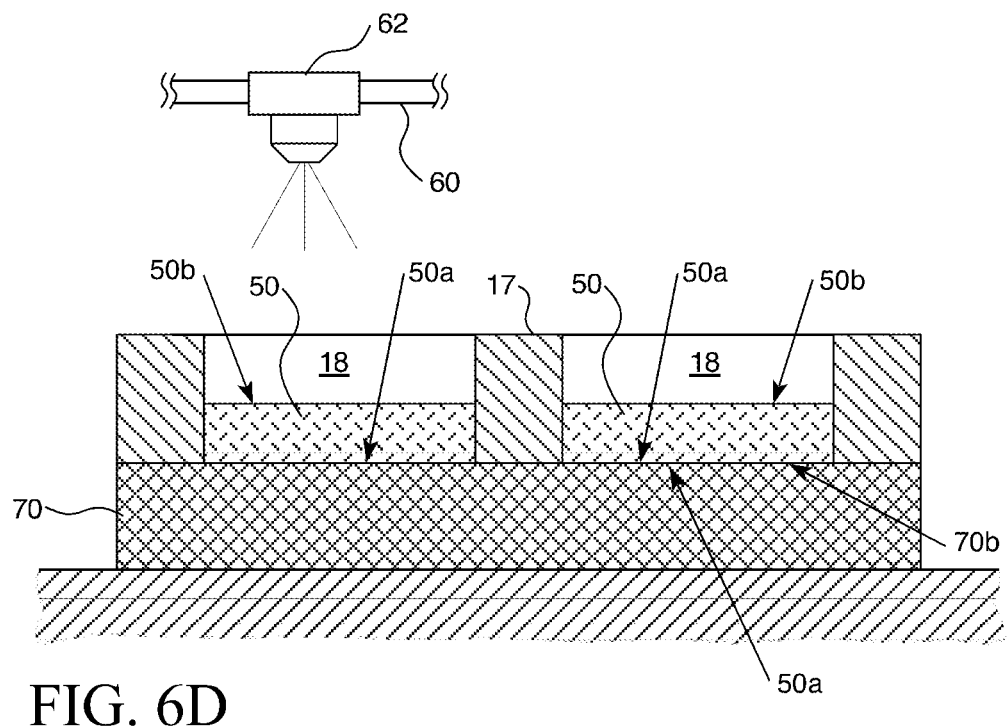
Figure 6E:
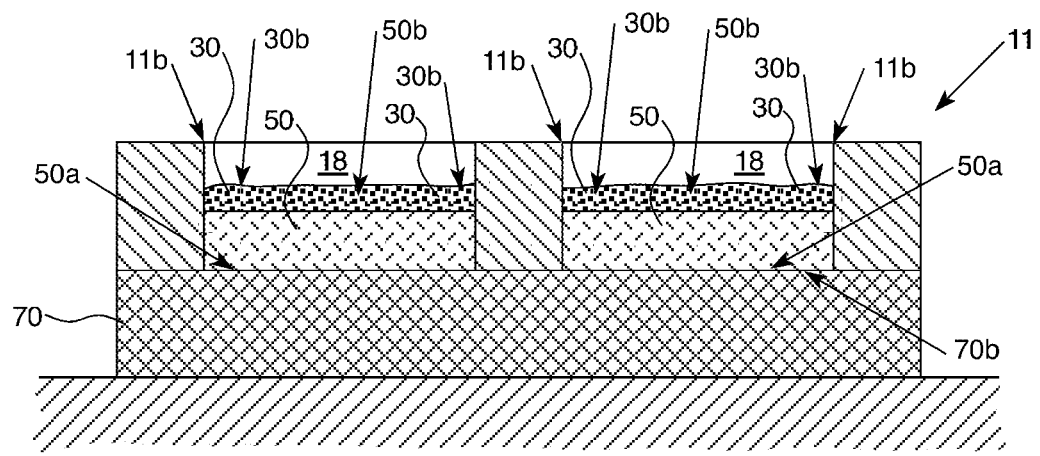

Referring to FIGS. 5 and 6E, for example, a foam layer 30 may be located within the cavity 18. The foam layer 30 adheres to the foam panel 70 and the brace 50 and may, but does not necessarily, cover at least a portion of the rear surface 50b of the brace 50. The foam layer 30 may, but does not necessarily, completely cover rear surface 50b of the brace 50 and completely encapsulates the brace 50 within the cavity 18.

In some embodiments, the brace 50 may be attached to the foam panel 70 with an adhesive. If desired, the brace 50 can be attached to the foam panel 70 with a construction adhesive that is compatible with the adjoining materials, such as, but not limited to, a foam material (which may be the same foam material or a different foam material as the foam material comprising the foam layer). In some embodiments, the brace 50 can be fastened to the foam panel 70 with one or more fasteners (not shown), such as screws, screw nails, nails, bolts, pins, or a combination of any thereof. It should be noted, however, that such optional fasteners do not function to provide significant mechanical attachment between the brace 50 and the foam panel 70 because of the relatively low fastener pull-out strength of the foam panel 70.

The foam layer 30 (and, optionally, any foam-based adhesive used to attach the foam panel 70 to the frame 11, and/or attach the brace 50 to the foam panel 70) can comprise, for example, polyurethane, polyurea, or polyisocyanurate, or a mixture thereof. If desired, the foam layer 30 can be substantially free, essentially free, or completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In certain embodiments, the foam layer 30 has a relatively high density. More particularly, in certain embodiments, the density of the foam layer 30 is at least 2.5 lb/ft$^3$ (40.1 kg/m$^3$), such as 2.5 to 5.0 lb/ft$^3$ (40.1 to 80.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Referring to FIG. 5, in some embodiments the foam layer 30 comprises a thickness T extending from the rear surface 70b of the foam panel 70 to a position intermediate the front frame surface 11a and the rear frame surface 11b. In this manner, a gap 40 may be formed within the frame 11 between a rear surface 30b of the foam layer 30 and the rear frame surface 11b. Although FIG. 5 shows the foam layer 30 comprising a thickness T extending from the rear surface 70b of the foam panel 70 to a position intermediate the front frame surface 11a and the rear frame surface 11b, it is understood that the foam layer 30 can alternatively comprise a thickness extending from the rear surface 70b of the foam panel 70 to the rear frame surface 11b, in which case there may be no gap formed within the frame 11 between the rear surface 30b of the foam layer 30 and the rear frame surface 11b. In some embodiments, particularly those in which nominally 2×4 frame members are used, the gap 40 has a width, from the rear surface of the foam layer 30b to the rear frame surface 11b, of at least 1 inch (2.54 cm), such as 1 to 2 inches (2.54 to 5.08 cm) or 1.5 to 2 inches (3.81 to 5.08 cm).

Figure 7:
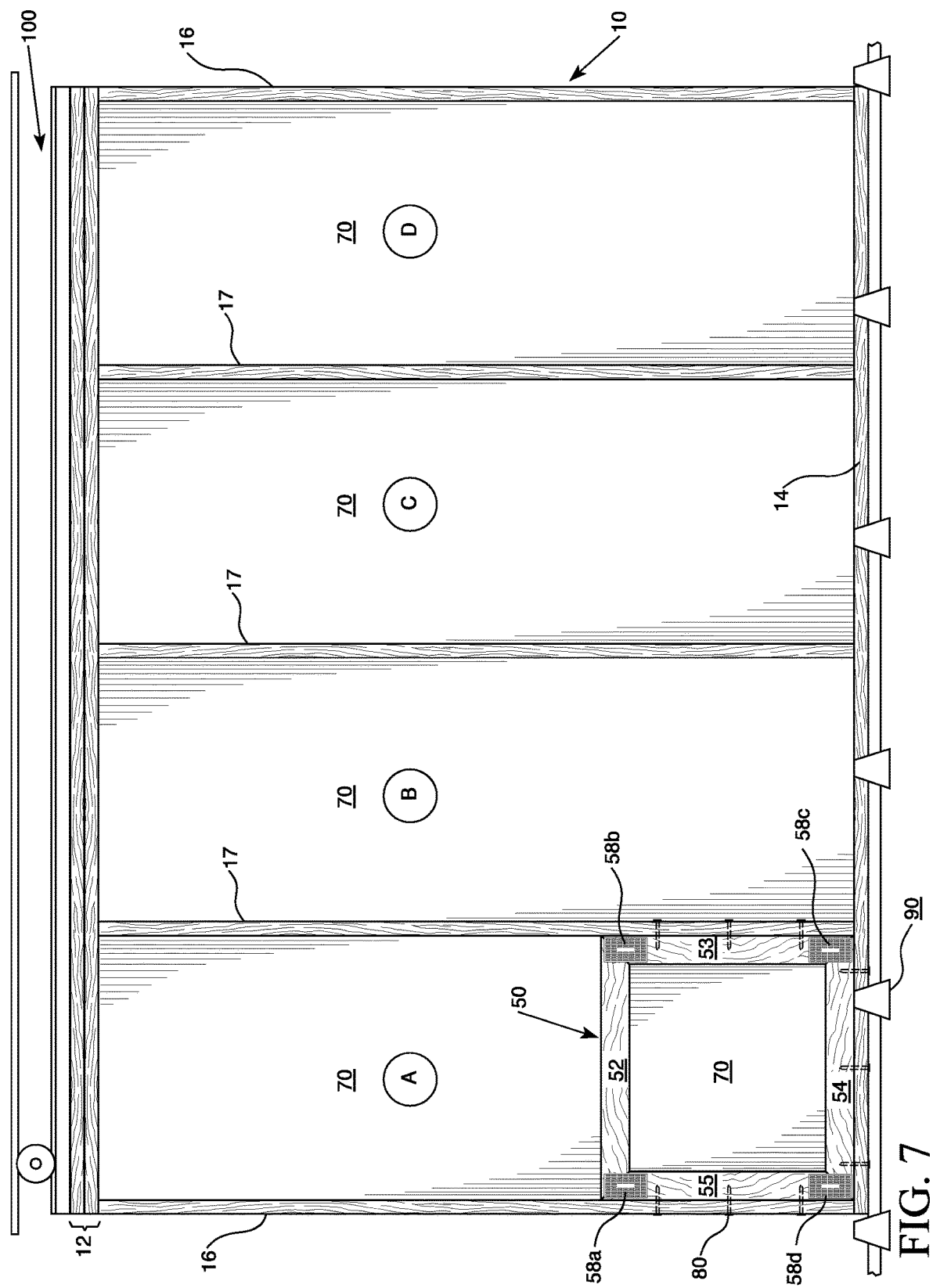
FIG. 7 is a rear view of a vertically oriented wall structure of the present specification during construction.

Another embodiment of a wall structure 10 is shown in FIG. 7. Here, wall structure 10 is vertically oriented on track 100 and is illustrated prior to inclusion of foam layer 30. As shown, brace 50 is disposed within one of the cavities form frame member 16 and 17 and foam panel 70, though it will be appreciated that one or more additional brace may also be incorporated into the wall structure 10 in one or more other cavities. In this embodiment, brace 50 comprises brace members 52, 53, 54, and 55 that comprise a front brace member surface that forms a front brace surface facing the foam panel 70 and a rear brace member surface that forms a rear brace surface facing away from the foam panel 70. In addition, as is illustrated, lateral load bearing connectors 58a, 58b, 58c, and 58d connect a brace member 52, 53, 54, and/or 55 to another brace member 52, 53, 54, and/or 55 of the brace 50. As mentioned earlier, one or more of the brace members 52, 53, 54 and/or 55 may also be fastened to a frame member 12, 14, 16 or 17 via, for example, mechanical fasteners.

Referring to FIG. 7, a frame is shown comprising a first member 12, a second member 14 spaced apart from the first member 12, connecting members 16 extending between the first member 12 and the second member 14, and primary support members 17 positioned between the connecting members 16 and extending between the first member 12 and the second member 14. The first member 12, the second member 14, and the connecting members 16 each comprise a front surface (not shown) and a rear surface (12b, 14b, and 16b, respectively) that collectively form the front frame surface (not shown) and the rear frame surface 11b. The primary support member 17 comprises a front primary support surface (not shown) and an opposite rear primary support surface 17b. The front primary support surface corresponds to the front frame surface. The rear primary support surface 17b corresponds to the rear frame surface 11b.

As illustrated in FIG. 7, for example, a foam panel 70 may be attached to the front frame surface 11a and the front primary support surface (not shown in FIG. 7) so that the foam panel 70 overlies the front frame surface 11a. The foam panel 70, the first member 12, the second member 14, the members 16, and the primary support member 17 define cavities 18 within the frame. One or more braces 50 may be located within one or more cavities 18 and may be in contact with the rear-facing surface 70b of the foam panel 70. As illustrated in FIG. 5, for example, a foam layer 30 may be located within the cavity 18, adhered to the brace 50 and to the foam panel 70 and covering at least a portion of the rear surface 70b of the foam panel 70.

Referring to FIGS. 6A-6E, a method of manufacturing a wall structure comprises providing a frame 11 as shown in FIG. 6A. The frame 11 comprises a first member (not shown), a second member 14 spaced apart from the first member, connecting members 16 extending between the first member and the second member 14, and a primary support member 17 positioned between the connecting members 16 and extending between the first member and the second member 14. The first member (not shown), the second member 14, the connecting members 16, and the primary support member 17 each comprise a front surface (14a, 16a, and 17a, respectively) and a rear surface (14b, 16b, and 17b, respectively) that collectively form the front frame surface 11a and the rear frame surface 11b. The frame 11 may be provided on a rigid support surface 51 so that the rear frame surface 11b (i.e., the rear surfaces 14b, 16b, and 17b of the second member 14, the connecting members 16, and the primary support member 17, respectively) contact the rigid support surface 51.

As shown in FIG. 6B, a foam panel 70 may be attached to the front frame surface 11a. The foam panel 70 may comprise a construction as described above. As also described above, the foam panel 70 may be attached to front frame surface 11a (including any of the front faces of the first and second members, the front faces of the connecting members 16, and the front face of the primary support member) with fasteners (not shown). The fasteners may comprise nails, screw nails, staples, screws, bolts, or rivets, or a combination of any thereof. Alternatively, or in addition, the foam panel 70 may be attached to front frame surface 11a (including any of the front faces of the first and second members, the front faces of the connecting members 16, and the front face of the primary support member) with an adhesive (not shown). For example, a layer of foam may be deposited onto the rear-facing surface 70b of the foam panel 70 before attaching the foam panel 70 to the front frame surface 11a.

The foam panel 70, the first member (not shown), the second member 14, the connecting members 16, and the primary support member 17 define cavities 18 within the frame 11. Although FIGS. 6A-6E show the frame 11 comprising the primary support member 17, which results in two cavities 18, it is understood that the primary support member 17 could be omitted from the frame 11, in which case a single cavity 18 within the frame 11 would be defined by the first member (not shown), the second member 14, and the connecting members 16. In addition, two or more primary support members may be included within a frame, thereby defining three or more cavities. Referring to FIG. 6C, the frame structure and the attached foam panel 70 may be rotated 180 degrees through the horizontal plane so that the foam panel 70 contacts the rigid support surface. A brace 50, or multiple braces 50 if desired, may be positioned within one or more, in some cases all, of the cavities 18 and may be in direct or indirect contact with the rear-facing surface 70b of the foam panel 70.

The brace 50 can be positioned within the cavity 18 as described above. For example, the positioning of the brace 50 may not comprise attaching the brace 50 to the foam panel 70, and may comprise just physically positioning the brace 50 on the rear surface 70b of the foam panel 70. Alternatively, the positioning of the brace 50 may comprise attaching the brace 50 to the foam panel 70 using an adhesive. For example, a layer of adhesive (such as foam) may be deposited onto the rear surface 70b of the foam panel 70 before positioning the brace 50 within the cavity 18 and in contact with the rear surface 70b of the foam panel 70. Also, as described above, the one or more of the brace members 52, 53, 54, and/or 55 of the brace are such that the brace 50 has a width substantially spanning the entire width of cavity 18, so that sides of the brace 50 may contact connecting members 16. Moreover, in some embodiments, a brace member 52, 53, 54, and/or 55 is disposed substantially parallel to and in contact with a frame member 12, 14, and/or 16. In some cases, at least two, such as three, brace members 52, 53, 54, and/or 55 are in contact with a frame member 12, 14, and/or 16 and, in certain embodiments, the brace 50 is fastened to one or more of the frame members 12, 14 and/or 16 using, for example, mechanical fasteners (not shown), such as nails, screw nails, staples, screws, bolts, or rivets, or a combination of any thereof. Alternatively, or in addition, the brace members 52, 53, 54 and/or 55 may be fastened to frame members 12, 14 and/or 16 using an adhesive (not shown). For example, a layer of foam may be deposited onto the frame members 12, 14 and/or 16 and/or onto the brace members 52, 53, 54 and/or 55 before positioning the brace 50 into cavity 18.

Referring to FIGS. 6D and 6E, a foam layer 30 may be deposited into the cavities 18. The foam layer 30 may be deposited from a foam dispensing rig 60, which can include one or more nozzles 62 (however, it is understood that the foam can be deposited using any suitable operation such as, for example, manually using a foam spray gun). Referring to FIG. 6E, the deposited foam layer 30 may be located in the cavity 18 such that the foam layer 30 covers rear surface 50b of the brace 50 and completely encapsulates the brace 50 within the cavity 18. The foam layer 30 may be deposited to a thickness extending from the rear surface 70b of the foam panel 70 to a position intermediate the front frame surface 11a and the rear frame surface 11b such that a gap 40 may be formed within the frame 11 between the rear surface 30b of the foam layer 30 and the rear frame surface 11b. It is understood, however, that the foam layer 30 can alternatively be deposited to a thickness extending from the rear surface 70b of the foam panel 70 to the rear frame surface 11b, in which case no gap is formed within the frame 11 between the rear surface 30b of the foam layer 30 and the rear frame surface 11b. The deposited foam layer 30 cures and adheres to the brace 50 and the foam panel 70.

Figure 9:
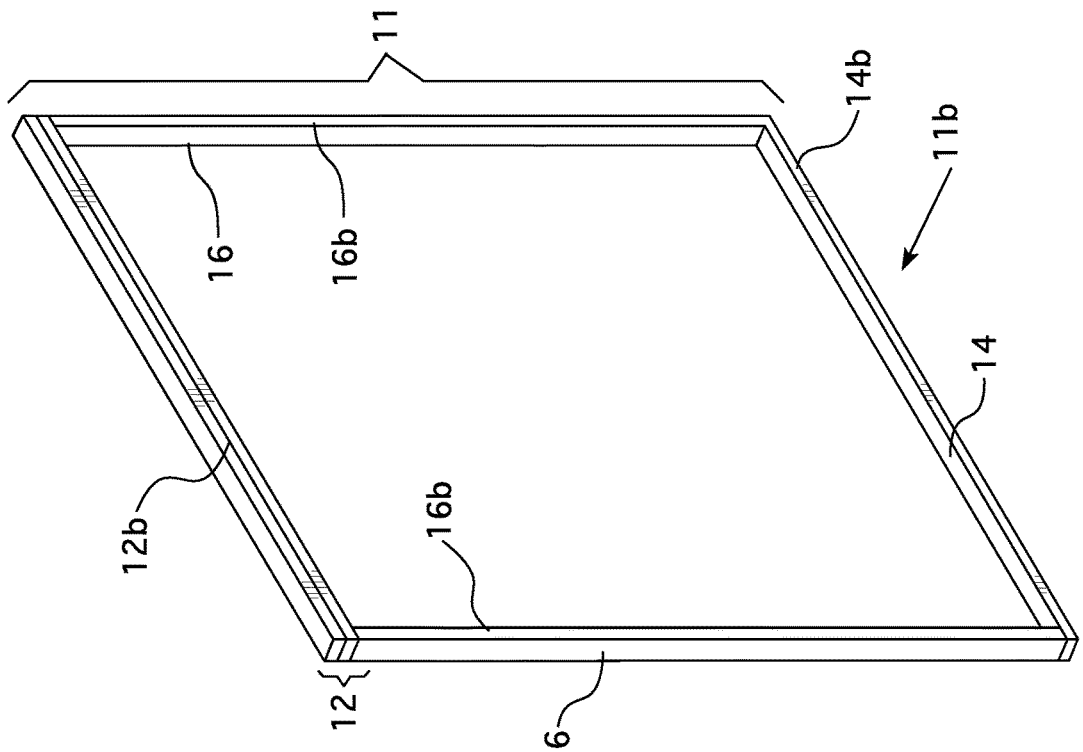
FIG. 9 is a rear perspective view of the wall structure frame shown in FIG. 8.
Figure 8:
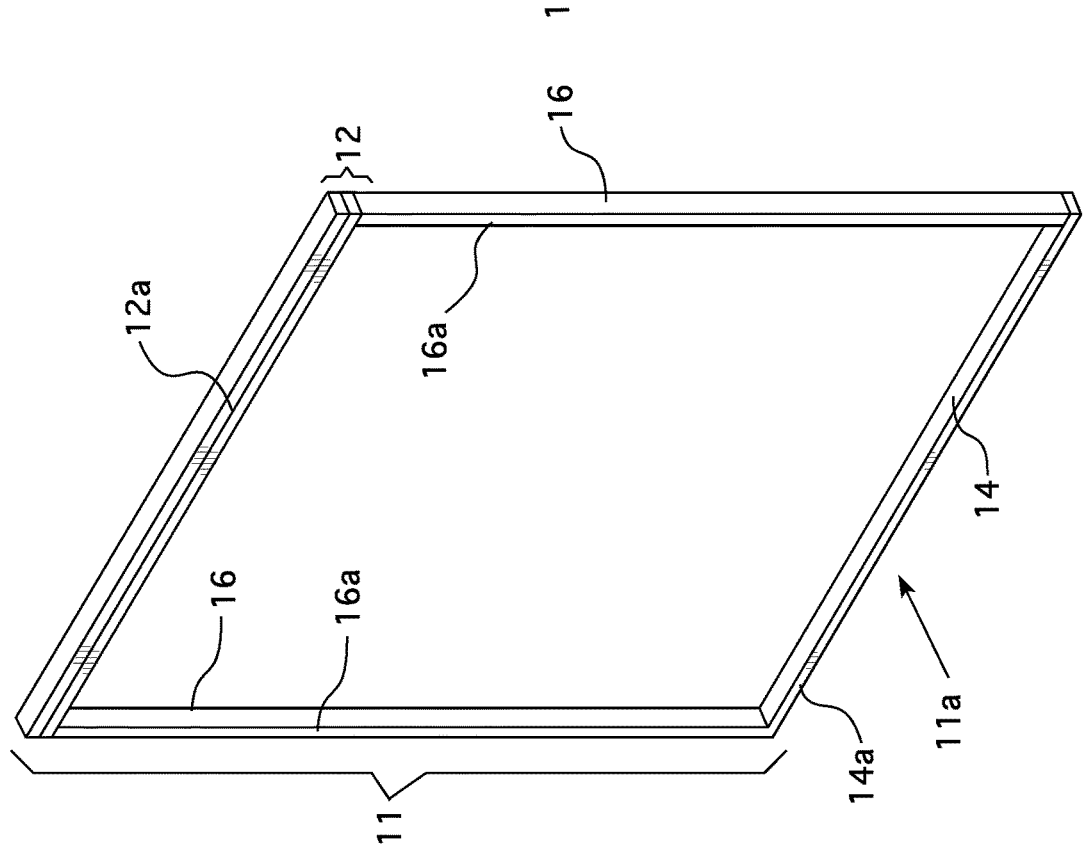
FIG. 8 is a front perspective view of a wall structure frame.

FIGS. 8-20 illustrate additional features of the wall structures and the methods of manufacturing the wall structures described in this specification. For example referring to FIGS. 8 and 9, a wall structure 10 includes a frame 11, a foam panel 70, a foam layer 30, and a brace (not shown in FIGS. 8-20). As shown in FIGS. 8 and 9, the frame 11 may be defined by a first member 12, a second member 14 spaced apart from the first member 12, and connecting members 16 extending between the first member 12 and the second member 14. The first member 12, the second member 14, and the connecting members 16 each have a front surface 12a, 14a, 16a and a rear surface 12b, 14b, 16b that define a front frame surface 11a and a rear frame surface 11b, respectively.

The frame 11 can be constructed into different shapes depending on its intended use. For example, as shown in FIGS. 8 and 9, the frame 11 can be constructed as a conventional industry standard rectangular or square frame 11. The first member 12 and the second member 14 may be spaced apart and extend parallel to each other, and the connecting members 16 may extend perpendicular to the first member 12 and the second member 14 so as to form a rectangular or square frame 11. The shape and design of the frame 11 is not so limited and can be constructed into any desired shape. Generally, the shape and design of the frame 11 is constructed in accordance with the floor plans designed for a particular home or building.

Referring to FIGS. 10 and 11, at least one primary support member 17 may be positioned between the connecting members 16. The primary support members 17 may extend between the first member 12 and the second member 14. The primary support members 17 may define a front primary support surface 17a and a rear primary support surface 17b. As shown in FIGS. 10 and 11, the front primary support surface 17a and the rear primary support surface 17b correspond to the front frame surface 11a and the rear frame surface 11b of the frame 11. The primary support members 17 may be spaced apart to form cavities 18. The cavities 18 may be defined by the space formed within the frame 11 between the primary support members 17, the members 16, the first member 12, and/or the second member 14. The size of each cavity 18 can vary based on the size of the frame 11, the distance between consecutively positioned primary support members 17, and the number of primary support members 17 present. The primary support members 17, the members 16, the first member 12, and/or the second member 14 may comprise one or more plates, panels, beams, studs, or the like. For example, as shown in the Figures, the first member 12 may include two beams.

The connecting members 16 and/or the primary support members 17 may be fixedly engaged to the first member 12 and the second member 14. For example, the connecting members 16 and/or the primary support members 17 may be fixedly engaged to the first member 12 and the second member 14 with fasteners. Suitable fasteners include, but are not limited to, nails, screw nails, nail plates, staples, bolts, screws, and rivets. The first member 12, the second member 14, the connecting members 16, and the primary support members 17 can be made of various materials. For example, the first member 12, the second member 14, the connecting members 16, and the primary support members 17 can be made of wood, metal, fiberglass, plastic, wood-polymer composite materials, or a combination of any thereof. The first member 12, the second member 14, the connecting members 16, and the primary support members 17 can be made of the same material or different materials.

The dimensions of the first member 12, the second member 14, the connecting members 16, and the primary support members 17 can vary depending on the intended use of the frame 11. The first member 12, the second member 14, the connecting members 16, and the primary support members 17 can each have any dimension. The first member 12, the second member 14, the connecting members 16, and the primary support members 17 can have the same dimensions. For example, the first member 12, the second member 14, the connecting members 16, and the primary support members 17 may have the same thickness and width dimensions, and the same or different length dimensions. For example, the first member 12, the second member 14, the connecting members 16, and the primary support members 17 can all have a thickness and width dimension of nominally 2×4 inches. In another example, the first member 12, the second member 14, the connecting members 16, and the primary support members 17 can all have thickness and width dimensions of nominally 2×6 inches.

The first member 12, the second member 14, and the connecting members 16 can have the same dimensions, which may be different than the dimensions of the primary support members 17. For example, the first member 12, the second member 14, and the connecting members 16 may have the same thickness and width dimensions, and the primary support members 17 may have thickness and/or width dimensions that may be different than the dimensions of the first member 12, the second member 14, and the connecting members 16. For example, the first member 12, the second member 14, and the connecting members 16 can have thickness and width dimensions of nominally 2×6 inches, and the primary support members 17 can have thickness and width dimension of nominally 2×4 inches.

Figures 12, 13:
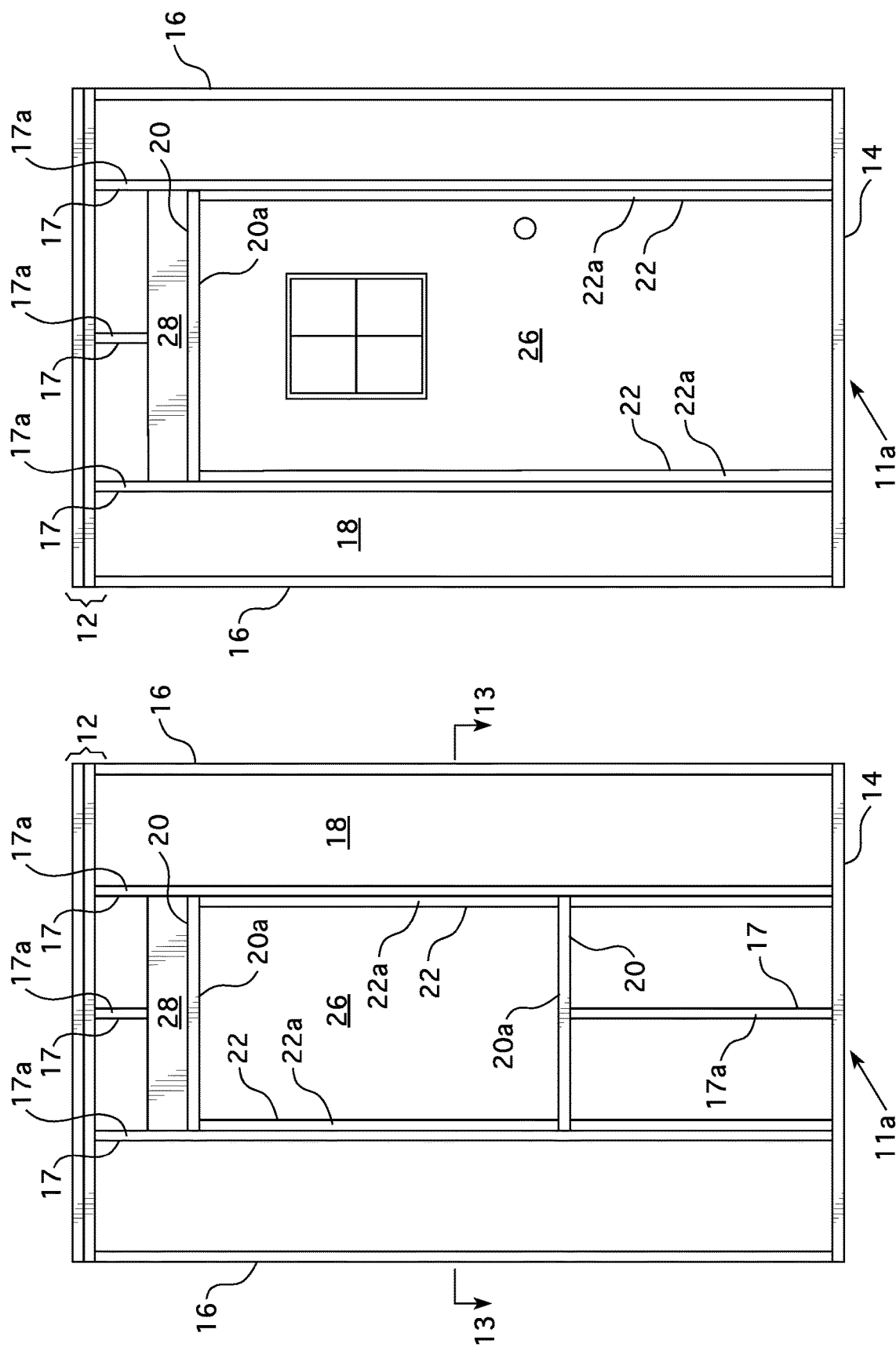
FIG. 12 is a front view of a wall structure frame with a window opening.
FIG. 13 is a front view of a wall structure frame with a door.

Referring to FIGS. 12 and 13, a wall structure 10 can comprise one or more secondary support members 20, and/or tertiary support members 22. The secondary support members 20 and the tertiary support members 22 may comprise one or more plates, panels, beams, studs, or the like. The secondary support members 20 and the tertiary support members 22 can be incorporated into the frame 11 to provide additional structural support, for example, to form spaces for windows, doors, and the like. The secondary support members 20 and the tertiary support members 22 can have dimensions that are the same as or different than the primary support members 17, the members 16, the first member 12, and/or the second member 14. For example, the secondary support member 20 and the tertiary support members 22 can have shorter lengths than the primary support members 17, the members 16, the first member 12, and/or the second member 14.

As shown in FIGS. 12 and 13, the secondary support members 20 may have a front secondary support surface 20a and a rear secondary support surface (not shown in FIGS. 12 and 13) that correspond with the front and rear frame surfaces 11a and 11b, and the front and rear primary support surfaces 17a and 17b. Similarly, the tertiary support members 22 may have a front tertiary support surface 22a and a rear tertiary support surface 22b (see FIG. 16) that correspond with the front and rear frame surfaces 11a and 11b and the front and rear primary support surfaces 17a and 17b.

The secondary support members 20 extend between and attach to the primary support members 17, or alternatively, the secondary support members 20 extend between and attach to a primary support member 17 and a member 16. The tertiary support members 22 extend between two secondary support members 20 or between a secondary support member 22 and the first member 12 and/or the second member 14.

The secondary support members 20, the tertiary support members 22, the primary support members 17, the members 16, the first member 12, and/or the second member 14 form a secondary cavity 26. As shown in FIGS. 12 and 13, the secondary cavity 26 can be used as a space for a window, a door, or any other opening. For example, the secondary support members 20, the tertiary support members 22, the primary support members 17, the members 16, the first member 12, and the second member 14 can be constructed as a conventional industry standard rectangular or square wall panel having a window, door, or any other opening. For example, referring to FIG. 12, a rectangular or square wall structure having a window can be formed as follows: a first member 12 and a second member 14 may be spaced apart and extend parallel to each other; connecting members 16 may extend between the first member 12 and the second member 14 in a direction perpendicular to the first member 12 and the second member 14; primary support members 17 may be positioned between the members 16 and extend between the first member 12 and the second member 14 in a direction perpendicular to the first member 12 and the second member 14; two secondary support members 20 may be spaced apart and extend between the primary support members 17 in a direction parallel to the first member 12 and the second member 14; and two tertiary support members 22 may be spaced apart and extend between the two secondary members 20 in a direction perpendicular to the secondary support members 20 and the first member 12 and the second member 14. In addition, the primary support members 17 can also extend between the secondary members 20 and the first member 12 and/or the second member 14. As shown in FIG. 13, a secondary cavity 26 may be formed between the secondary support members 20 and the tertiary support members 22. The resulting rectangular or square wall panel can be used in a residential home or building. The shape and design of the frame 11 of the wall structure 10 is not so limited and can assume any shape and design as desired.

Additional support members and structural elements may also be used depending on the intended use of the wall structure 10. For example, and as shown in FIGS. 12 and 13, a header 28 may be used to provide additional support for a door or window. Other additional support members may be used for structural purposes, design purposes, and the like.

Referring to FIGS. 14, 15A, and 15B, a foam panel 70 may be attached to at least a portion of the front frame surface. As described above, the foam panel 70 can comprise, for example, a polyiso foam panel, an expanded polystyrene foam panel, or an extruded polystyrene panel.

In one specific example, the foam panel 70 comprises a polyiso panel. Compared to polyurethane foams, polyiso foams have a much higher isocyanate content. Through the use of certain catalysts the isocyanate is able to react with itself forming a ring-like structure (polyisocyanurate) that is very stable. Polyiso panels typically have a thickness which varies depending on the application. For example, a polyiso panel can have a thickness of about ½-inch to about 4-inches, or any sub-range subsumed therein such as, for example, about ¾-inch to about 2-inches. The polyisocyanurate foam layer of a polyiso panel may have a front face and a rear face, as described above.

The foam panel 70 may be attached to the front frame surface by various attachment mechanisms. For example, the foam panel 70 can be attached to the front frame surface by fasteners. The fasteners used to attach the foam panel 70 to the front frame surface are not necessarily the same as the fasteners used to engage the first and second members, as described above. Suitable fasteners may include nails, screw nails, staples, screws, bolts, or rivets, or a combination of any thereof. Because foam panel 70 may comprise polyisocyanurate foam or foams having relatively low fastener pull-out strength, care must be used when mechanically fastening foam panels 70 to frames so as not to damage the foam panels.

Alternatively, the foam panel 70 can be attached to the front frame surface by the use of one or more adhesives. The adhesives may be selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described below, a foam material may be used as the adhesive. For example, a layer of non-foamed adhesive and/or adhesive foam may be applied to the foam panel, the front frame surface, or both, before positioning and attaching the foam panel to the front frame surface.

As described above, foam panels generally comprise facers on both sides of the core layer, which may be the same or different. As also described above, examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). The foam panel may comprise a facer material attached to at least a portion of the front face and/or the rear face of the core layer. The facer material can cover the entire surface of the front face or the rear face or both the front and rear faces of the core layer. The facer material may advantageously promote adhesion of the foam layer 30 to the foam panel 70. As described above, the facer material on the front face may be the same as or may be different than the facer material on the rear face.

The foam panel 70 attached to the frame 11 may comprise multiple separate foam panels (i.e., multiple sections) which may be joined together by suitable tape or liquid applied sealer such as caulk or polyurethane foam to form the foam panel 70.

The foam layer 30, which adheres to the foam panel 70 and the brace 50, comprises a foam material deposited into the frame 11. Examples of foam material that can be used include foam materials made with polyurethane, polyurea, polyisocyanurate (also referred to as polyiso, as described above), and mixtures thereof. As described above, the foam material may be substantially free, may be essentially free, and may be completely free of halogen containing flame retardant additives.

As shown in FIGS. 16, 17, 18, 19, and 20, the foam material can be deposited into the frame 11 such that the foam material forms a foam layer 30 within at least a portion of the frame 11 between the front frame surface 11a and the rear frame surface 11b, and adheres to the foam panel 70 and the brace 50 (not shown in FIGS. 16, 17, 18, 19 and 20).

The foam layer 30 can be dimensioned to expand to a position intermediate the front frame surface 11a and the rear frame surface 11b, thereby forming a gap 40 within the wall structure 10 between the foam layer 30 and the rear frame surface 11b. FIGS. 10 and 11 further show that the gap 40 can be used as an area to incorporate home utility components 42 such as electrical wires, cords, heating and cooling pipes, and plumbing fixtures (which may be further positioned through a penetration opening (not shown in FIGS. 10 and 11) in the foam layer 30, the foam panel 70, and a brace 50 (not shown in FIGS. 10 and 11)). These home utility components may be inserted into the gap 40 located between the foam layer 30 and the rear frame surface 11b such that utilities components are not surrounded by or contacting the foam layer 30. In one example, the gap 40 comprises at least two inches as measured between the foam layer 30 and the rear frame surface 14.

Figure 16:
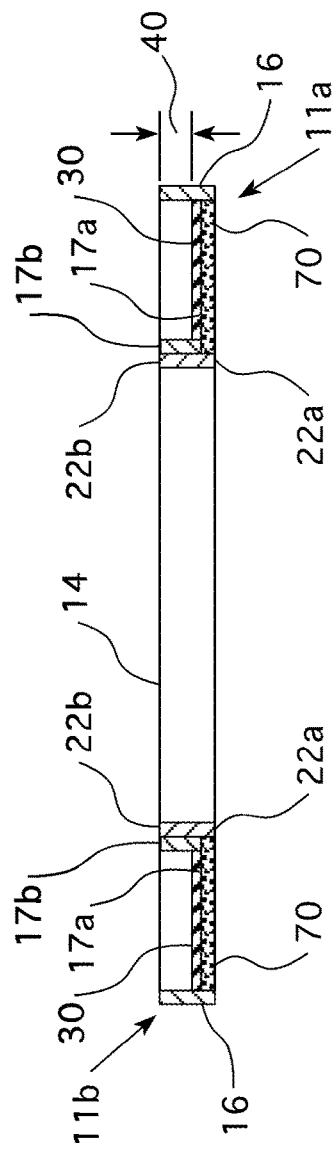
FIG. 16 is a top cross-sectional view of the wall structure of FIG. 12, at the vertical position where the window opening is located.
Figure 17:
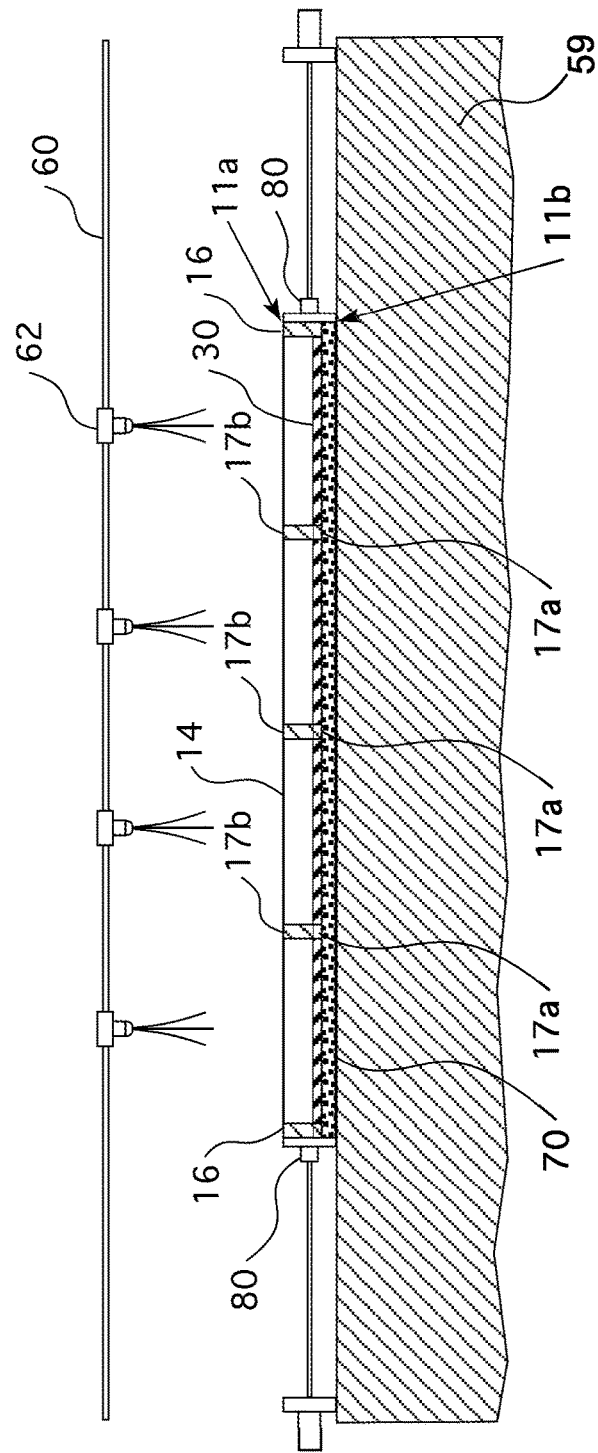
FIG. 17 is a top cross-sectional view of foam material being deposited into a frame.
Figure 20:
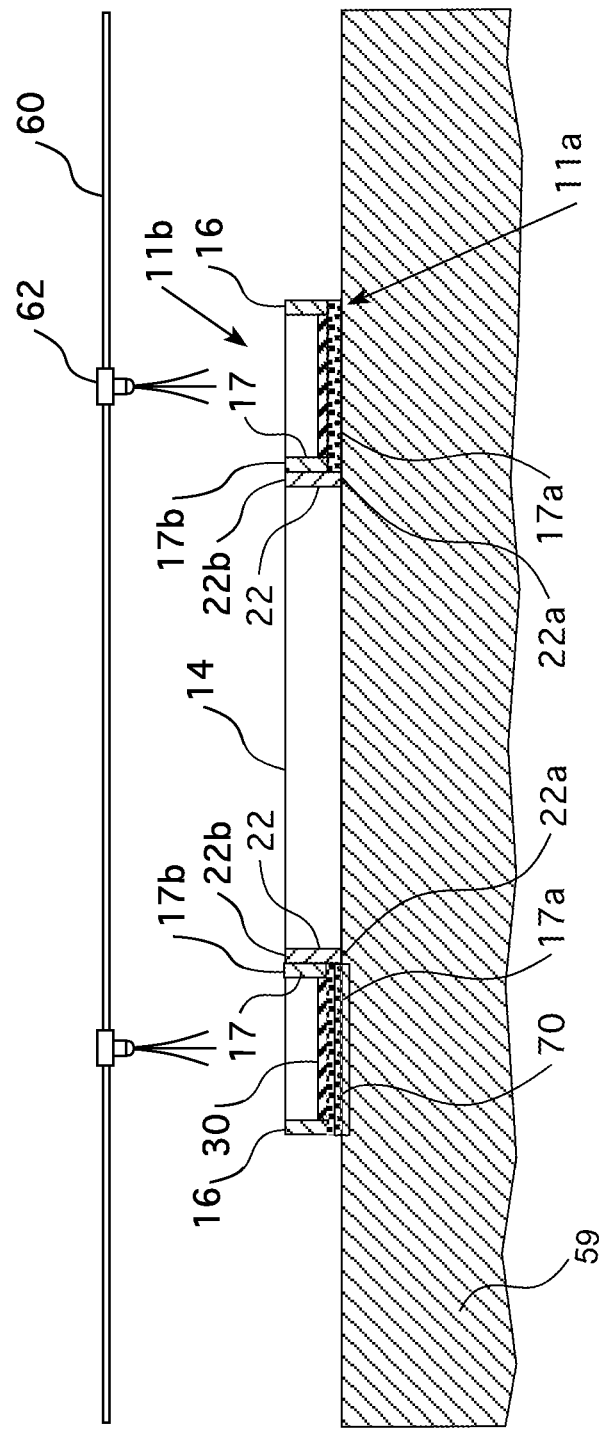
FIG. 20 is a top cross-sectional view of foam material being deposited into a frame.

When secondary support members 20 and/or tertiary support members 22 are used with the foam wall structure 10 to form a secondary cavity 26, the secondary cavity 26 can be free of foam. For example, the foam layer 30 does not extend beyond and over the front secondary support surfaces 20a of the secondary members 20, the front tertiary support surfaces 22a of the tertiary support members 22, and/or beyond and over at least a portion of the front surfaces of other members that help form the secondary cavity 26. FIG. 16, for example, shows a top cross-sectional view with the foam layer 30 not extending beyond the front tertiary support surface 22a of the tertiary members 22. In such cases, corresponding openings may also be present in the foam panel 70. Such openings in the foam panel 70 can be formed by cutting out portions of the foam panel 70 that cover portions of the wall structure that are to be free of foam, such as door and/or window frames.

The foam layer 30 can be formed in-situ during the manufacturing process. The term "formed in-situ during the manufacturing process," as used in this specification, refers to the formation of a foam layer 30 as described in this specification during manufacturing of the foam wall structure 10 off-site at a facility remote or away from a building construction site. As such, the foam layer 30 may be formed not at a construction site as is required by conventional methods, but instead as a component of the pre-fabricated wall structure 10. As used herein, "pre-fabricated" means that the wall structure is manufactured at a facility remote from a building construction site.

The foam layer 30 is able to fill tight spaces and seal gaps that may not be visible to the naked eye. The foam layer 30 can also act as a vapor and thermal insulating bather, which reduces energy consumption in buildings and residential homes when the wall structure 10 is used as a constituent wall panel. The foam layer 30 may provide structural stability to the wall structure 10, such as improved wall racking strength, which refers to the ability of a wall structure to maintain its shape under shear stress. Additionally, as described above, the foam layer 30 may adhere to brace 50, which secures the brace 50 in place relative to the rear surface 70b of the foam panel 70, and which, it has been discovered, can result in a wall structure with significantly enhanced racking strength.

The present specification is also directed to methods of manufacturing a wall structure. A method of making a wall structure includes attaching the foam panel 70 to the front frame surface 11a; positioning the brace 50 within the cavity 18 and in contact with the rear surface 70b of the foam panel 70; fastening the brace 50 to the frame 11 with one or more mechanical fasteners; depositing the foam layer 30 into the cavity 18, so that the foam layer 30 covers foam panel 70 and brace 50; and allowing the foam layer to cure. The frame can optionally having at least one primary support member and can be constructed in accordance with any of the examples described in this specification and shown in the drawings. A foam panel 70 is attached to the frame 11 at the front frame surface 11a, as described above.

After constructing or otherwise providing the frame 11, optionally with at least one primary support member 17, and attaching a foam panel 70, the front frame surface 11a can be orientated over a rigid surface 51 such that the front frame surface 11a is positioned parallel or at least substantially parallel to the rigid surface 51. A "rigid surface" refers to any surface that is capable of receiving the frame 11 without bending, flexing, or moving. As shown in FIGS. 17-20, the rigid surface 51 has a width equal to or greater than the width of the front frame surface 11a and a length equal to or greater than the length of the front frame surface 11a. The rigid surface 51 may be positioned horizontally (as shown), vertically, or at an angle ranging from zero degrees to 90-degrees from the horizontal.

After orientating the front frame surface 11a over the rigid surface 51, a brace (not shown in FIGS. 17-20) may be positioned within the cavity 18 in the frame 11 and in contact with a rear-facing surface of the foam panel 70, as described above, and a foam material may be deposited into the frame 11. The foam material may be deposited into the frame 11 with an automated delivery device. Alternatively, the foam may be deposited into the frame 11 using various other devices including, but not limited to, foam dispensing gun(s) that are controlled and carried by an individual user or users. As shown in FIGS. 17-20, the foam material may be deposited into the frame 11 with an automated foam dispensing rig 60 that can be calibrated to dispense a predetermined amount of foam. The foam dispensing rig 60 can include one or more nozzles 62. The nozzles 62 can be positioned over the frame 11 of the wall structure 10 so that each nozzle 62 sprays or pours foam into cavities 18 located within the frame 11. A foam dispensing rig 60 with a plurality of nozzles 62 makes it possible to dispense foam quickly and efficiently. The nozzles 62 can controllably move into different positions.

Still referring to FIGS. 17-20, the foam material may be deposited into the frame 11 so that the foam material contacts the rear surfaces of the foam panel 70 and brace 50 (not shown in FIGS. 17-20). The foam material may be deposited so that the foam layer 30 extends beyond the front primary support surfaces 17a and the front frame surface 11a. Alternatively, the foam material may be deposited into the frame 11 so that the foam layer 30 does not extend beyond the front frame surface 11a. Accordingly, the foam material can be deposited into the frame 11 so that a foam layer 30 forms and may be flush with the front frame surface 11a or contained between the front frame surface 11a and the rear frame surface 11b.

The foam material can be deposited into the frame 11 so that the foam layer 30 can expand to a position intermediate the front frame surface 11a and rear frame surface 11b. A gap or opening 40 can therefore be formed between the foam layer 30 and the rear frame surface 11b to incorporate home utility components 42 such as electrical wires, cords, heating and cooling pipes, and plumbing fixtures. As shown in FIG. 19, a barrier 72 may be positioned between adjacent primary support members 17 to prevent foam material from expanding into undesired areas (e.g., window or door opening). A clamp 82 may be placed around the perimeter of the frame 11 hold the frame while the foam is deposited inside the frame 11.

The front frame surface 11*a* can be placed over the rigid surface 51 without elevating the frame 11. The foam material can be deposited into the frame 11 such that a foam layer 30 is formed flush with the front primary support surfaces 17*a* and not the front frame surface 11*a*.

As described above, the wall structure 10 can also include secondary support members 20 and tertiary support members 22 that form a secondary cavity 26 within the frame 11. The described methods therefore include constructing or otherwise providing a frame 11 having one or more secondary support members 20 and tertiary support members 22. To prevent deposited foam material from entering the secondary cavity 26, the dimensions of the secondary support members 20 and/or tertiary support members 22 may or may not have a greater height than the primary support members 17.

After the foam layer 30 has expanded and cured, the wall structure 10 can be removed from the rigid surface 51 and shipped to a job site for use as a wall panel. Accordingly, the present specification is also directed to a pre-fabricated wall panel comprising the wall structure described in this specification.

The wall structure can be installed without any additional steps, thereby reducing the number of sub-contractors necessary to complete the installation of a wall at a construction site. In addition, the wall structure does not require additional materials such as exterior OSBs, and house wrap that are typically used in current residential building practices. Therefore, the wall structures described in this specification can decrease construction costs and/or decrease the overall cost per square foot per R-value.

The wall structures described in this specification also can impart a higher wall racking strength and improve thermal performance in comparison to existing wall solutions through the combination of the foam layer, brace, and the foam panels. Further, the wall structures described in this specification can help meet future R-value industry standards that are expected to increase in certain regions. With current fiberglass insulation, builders would have to convert 2×4-based wall designs to 2×6-based wall designs to ensure enough wall cavity capacity for additional insulation to meet such higher standards.

The wall structures described in this specification can also improve the consistency of installed insulation, and make it easy to install electrical and plumbing components, including components connected to exterior fixtures. The wall structures described in this specification can be used in new building construction or in retrofit or repair applications.

The wall structure 10 may also be installed with tie downs that may be affixed to the frame 11 to provide additional shear strength to the wall structure 10. Suitable tie downs include those available under the tradename QuickTie™ from QuickTie™ Products, Inc., Jacksonville, Fla., as well as various tie downs commercially available from Simpson Strong-Tie Company, Inc., Pleasanton, Calif.

EXAMPLES

Various 2×4 studded (24" on center) 8 foot×8 foot wall panels were backed with a 1 inch thick polyisocyanurate (polyiso) rigid wall insulation panel having a closed cell polyisocyanurate foam core, faced with a coated glass-mat facer on both sides available from Hunter Panels, Portland, Me., as Hunter Xci CG (referred to as "1 inch cgf polyiso") to provide a wall structure having the configuration of FIG. 7 in which the width of each of cavities A, B, C, and D was 24 inches. A brace was set inside one or more of the cavities. Brace members were constructed of Southern Yellow Pine Stud 2×4 lumber and were connected together using screws or 20 gauge mending plates (MP36, commercially available from Simpson Strong-Tie Company Inc.) to provide braces having the geometric shapes, sizes and configurations set forth in Table 1 below. Brace members were fastened to frame members as described in Table 1. Polyurethane spray foam (Bayseal® CC STR, commercially available from Accella Performance Materials) was spray applied at a nominal thickness of 1.5" in the cavities over the polyiso panel and brace so that the polyiso panel and brace were completely covered with spray applied foam. In the comparative examples, either no brace was employed, no rigid wall insulation panel was employed and/or no spray foam was employed, as indicated in Table 1. All of the experimental walls were tested according to ASTM E72-15 and pushed to failure at the standard testing force rate found in ASTM E72-15. Results are set forth in Table 1.

TABLE 1

| Wall | Brace description and attachment to frame | Depiction | Rigid wall insulation panel | Polyurethane spray foam | Ultimate strength (lbs/in ft) |
|---|---|---|---|---|---|
| 1 | None | | 1" cgf polyiso | Yes | 517 |
| 2 | 2' wide x 4' high rectangle with members connected with mending plates, installed at the bottom of cavity A; connected to frame using 3.5" x 0.131" nails, every 6" on 2 sides + bottom | ▯ | none | none | 63 |
| 3 | 2' wide x 4' high rectangle with members connected with mending plates, installed at the bottom of cavity A; connected to frame using 3.5" x 0.131" nails, every 6" on 2 sides + bottom | ▯ | 1" cgf polyiso | Yes | 667 |
| 4 | 2' wide x 2' high square with members connected with mending plates, installed at the bottom of cavity A; connected to frame using 3.5" x 0.131" nails, every 6" on 2 sides + bottom | ▫ | 1" cgf polyiso | Yes | 574 |
| 5 | 2' wide x 8' high rectangle with members connected with mending plates, installed in cavity A; connected to frame using 3.5" x 0.131" nails, every 6" on 2 sides + bottom | ▯ | 1" cgf polyiso | Yes | 638 |

TABLE 1-continued

| Wall | Brace description and attachment to frame | Depiction | | | | Rigid wall insulation panel | Polyurethane spray foam | Ultimate strength (lbs/in ft) |
|---|---|---|---|---|---|---|---|---|
| 6 | 2' wide x 8' high rectangle with members connected with mending plates, installed in cavity D; connected to frame using 3.5" x 0.131" nails, every 6" on 2 sides + bottom | | | |  | 1" cgf polyiso | Yes | 571 |
| 7 | 2' wide x 8' high rectangles with members connected with mending plates, installed in cavities A and D; connected to frame using 3.5" x 0.131" nails, every 6" on 2 sides + bottom |  | | |  | 1" cgf polyiso | Yes | 531 |
| 8 | 2' wide x 4' high rectangle with members connected with mending plates, installed at the vertical midpoint of cavity A; connected to frame using 3.5" x 0.131" nails, every 6" on 2 sides |  | | | | 1" cgf polyiso | Yes | 593 |
| 9 | 2' wide x 4' high rectangle with members connected with mending plates, installed at the vertical midpoint of cavity A; connected to frame using 3.5" x 0.131" nails, every 6" on 2 sides (duplicate of wall 8) |  | | | | 1" cgf polyiso | Yes | 462 |
| 10 | 2' wide x 2' high squares with members connected with mending plates, installed at the top and bottom of cavities A and D; each top brace connected to frame with 3.5" x 0.131" nails, every 6" on 2 sides + top; each bottom brace connected to frame with 3.5" x 0.131" nails, every 6" on 2 sides + bottom |  | | |  | 1" cgf polyiso | Yes | 491 |
| 11 | 2' wide x 2' high squares with members connected with mending plates, installed at the bottom of cavities A, B, C and D; each connected to frame with 3.5" x 0.131" nails, every 6" on 2 sides + bottom |  |  |  |  | 1" cgf polyiso | Yes | 754 |
| 12 | 2' wide x 4' high rectangle with members connected with screws, installed at the bottom of cavity A; connected to frame with 3.5" x 0.131" nails, every 6" on 2 sides + bottom |  | | | | 1" cgf polyiso | Yes | 554 |
| 13 | 2' wide x 2' high square with members connected with 3x #9 3.5" screws at each joint, installed at the bottom of cavity A; connected to a frame with 3.5" #9 screws, every 6" on 2 sides + bottom |  | | | | 1" cgf polyiso | Yes | 728 |
| 14 | 2' wide x 2' high square with members connected with 3x #9 3.5" screws at each joint, installed at the bottom of cavity A; connected to frame with 3.5" x 0.131" nails, every 6" on 2 sides + bottom |  | | | | 1" cgf polyiso | Yes | 623 |
| 15 | 2' wide x 2' high squares with members connected with 3x #9 3.5" screws at each joint, installed at the bottom of cavities A and D; each connected to frame with 3.5" x 0.131" nails, every 6" on 2 sides + bottom |  | | |  | 1" cgf polyiso | Yes | 624 |
| 16 | 11¼" wide x 8' high rectangles with members connected with mending plates, installed side by side in cavity A; each connected to frame with 3.5" x 0.131" nails, every 6" on side and bottom |  | | | | 1" cgf polyiso | Yes | 738 |
| 17 | 2' wide x 2' high triangle with members connected with mending plates, installed at the bottom of cavity A; connected to frame using 3.5" x 0.131" nails, every 6" on long side + bottom and 2 nails on short side |  | | | | 1" cgf polyiso | Yes | 531 |
| 18 | 2' wide x 2' high triangle with members connected with mending plates, installed at the bottom of cavity A; connected to frame using 3.5" x 0.131" nails, every 6" on long side + bottom and 2 nails on short side |  | | | | 1" cgf polyiso | Yes | 723 |
| 19 | 2' wide x 4' high triangle with members connected with mending plates, installed at the bottom of cavity A; connected to frame using 3.5" x 0.131" nails, every 6" on long side + bottom and 2 nails on short side |  | | | | 1" cgf polyiso | Yes | 542 |

TABLE 1-continued

| Wall | Brace description and attachment to frame | Depiction | Rigid wall insulation panel | Polyurethane spray foam | Ultimate strength (lbs/in ft) |
|---|---|---|---|---|---|
| 20 | 2' wide x 2' high triangles with members connected with mending plates, installed at the bottom of cavities A, B, C and D; each connected to frame using 3.5" x 0.131" nails, every 6" on long side + bottom and 2 nails on short side | ◣ ◢ ◣ ◢ | 1" cgf polyiso | Yes | 685 |

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A wall structure comprising:
   (a) a frame comprising:
      (i) a first member;
      (ii) a second member spaced apart from the first member; and
      (iii) connecting members extending between the first member and the second member, wherein the first member, the second member, and the connecting members each comprise a front surface and a rear surface that form a front frame surface and a rear frame surface;
   (b) a foam panel attached to the front frame surface, wherein:
      (i) the foam panel overlies the front frame surface; and
      (ii) the foam panel, the first member, the second member, and the connecting members define a cavity within the frame;
   (c) a brace disposed within the cavity and fastened to the frame with one or more mechanical fasteners, the brace comprising:
      (i) a plurality of elongated brace members comprising a front brace member surface and a rear brace member surface that form a front brace surface facing the foam panel and a rear brace surface facing away from the foam panel, wherein at least one elongated brace member is disposed in the cavity such that a side thereof is substantially parallel to and in contact with the first member or the second member and at least one elongated brace member is disposed in the cavity such that a side thereof is substantially parallel to and in contact with a connecting member; and
      (ii) a connector connecting an end of one brace member to an end of another brace member; and
   (d) a foam layer disposed within the cavity, wherein the foam layer adheres to the foam panel and the brace.

2. The wall structure of claim 1, wherein the foam panel comprises a polyisocyanurate foam layer and a facer material attached to a front face and/or a rear face of the polyisocyanurate foam layer.

3. The wall structure of claim 2, wherein the facer material comprises a fiberglass mat, a glass fiber-reinforced cellulosic felt, a coated and polymer-bonded fiber mats, a foil, a coated foil, a foil/membrane laminate, a foil/glass composite, and/or a polyolefin film.

4. The wall structure of claim 2, wherein the facer material comprises coated glass-mat.

5. The wall structure of claim 1, wherein the brace comprises at least 3 brace members.

6. The wall structure of claim 1, wherein the connector comprises a lateral load bearing connector that connects an end of one brace member to an end of another brace member to form a brace that has a geometric shape.

7. The wall structure of claim 6, wherein the geometric shape is a triangle, square, or rectangle.

8. The wall structure of claim 7, wherein the brace has a width substantially spanning the entire width of the cavity so that sides of the brace contact connecting members.

9. The wall structure of claim 8, wherein at least one of the plurality of brace members is in contact with a connecting member and the second member.

10. The wall structure of claim 6, wherein the lateral load bearing connector comprises a tie.

11. The wall structure of claim 10, wherein the tie comprises a connector plate constructed with steel that is coated with a zinc or zinc-aluminum alloy coating.

12. The wall structure of claim 1, wherein the foam layer completely covers the rear brace surface and completely encapsulates the brace within the cavity.

13. The wall structure of claim 1, wherein the foam layer has a density of 2.5 to 5.0 lb/ft$^3$.

14. A wall structure comprising:
(a) a frame comprising:
  (i) a first member;
  (ii) a second member spaced apart from the first member; and
  (iii) connecting members extending between the first member and the second member, wherein the first member, the second member, and the connecting members each comprise a front surface and a rear surface that form a front frame surface and a rear frame surface;
(b) a foam panel attached to the front frame surface, wherein:
  (i) the foam panel overlies the front frame surface; and
  (ii) the foam panel, the first member, the second member, and the connecting members define a cavity within the frame;
(c) a brace disposed within the cavity and fastened to the frame, the brace comprising:
  (i) a plurality of elongated brace members comprising a front brace member surface and a rear brace member surface that form a front brace surface facing the foam panel and a rear brace surface facing away from the foam panel, wherein at least one elongated brace member is disposed in the cavity such that a side thereof is substantially parallel to and in contact with the first member or the second member and at least one elongated brace member is disposed in the cavity such that a side thereof is substantially parallel to and in contact with a connecting member; and
  (ii) a lateral load bearing connector connecting an end of one brace member to an end of another brace member; and
(d) a foam layer disposed within the cavity, wherein the foam layer adheres to the foam panel and the brace.

15. The wall structure of claim 14, wherein the foam panel comprises a polyisocyanurate foam layer and a facer material attached to a front face and/or a rear face of the polyisocyanurate foam layer.

16. The wall structure of claim 15, wherein the facer material comprises coated glass-mat.

17. The wall structure of claim 14 wherein the lateral load bearing connector connects an end of one brace member to an end of another brace member to form a brace that has a geometric shape.

18. The wall structure of claim 14, wherein the lateral load bearing connector comprises a tie.

19. The wall structure of claim 18, wherein the tie comprises a connector plate constructed with steel that is coated with a zinc or zinc-aluminum alloy coating.

20. The wall structure of claim 14, wherein the foam layer has a density of 2.5 to 5.0 lb/ft$^3$.

* * * * *